US012806791B2

(12) United States Patent
Payne et al.

(10) Patent No.: US 12,806,791 B2
(45) Date of Patent: Nov. 24, 2026

(54) ROBOT ENABLED MOBILE DEVICE MANIPULATION SYSTEM, METHOD, AND APPARATUS

(71) Applicant: Assurant, Inc., New York, NY (US)

(72) Inventors: Nathaniel Payne, Knoxville, TN (US); Skylar Raney, Nashville, TN (US)

(73) Assignee: Assurant, Inc., New York, NY (US)

( * ) Notice: Subject to any disclaimer, the term of this patent is extended or adjusted under 35 U.S.C. 154(b) by 27 days.

(21) Appl. No.: 18/990,549

(22) Filed: Dec. 20, 2024

(65) Prior Publication Data

US 2025/0214253 A1 Jul. 3, 2025

Related U.S. Application Data

(60) Provisional application No. 63/615,548, filed on Dec. 28, 2023, provisional application No. 63/615,068, filed on Dec. 27, 2023.

(51) Int. Cl.
*B25J 9/16* (2006.01)
*B25J 9/00* (2006.01)
(Continued)

(52) U.S. Cl.
CPC ........... *B25J 9/1697* (2013.01); *B25J 9/0093* (2013.01); *B25J 9/1674* (2013.01); *B25J 9/1687* (2013.01);
(Continued)

(58) Field of Classification Search
CPC ...... B25J 9/1697; B25J 9/0093; B25J 9/1674; B25J 9/1687; B25J 13/085; B25J 19/023;
(Continued)

(56) References Cited

U.S. PATENT DOCUMENTS 10,836,043 B1 * 11/2020 Lobaton ................. B25J 13/081
11,673,264 B2 * 6/2023 Nikovski ............... B25J 9/1664 700/246
(Continued)

FOREIGN PATENT DOCUMENTS

CN 108012014 A 5/2018
CN 116859168 B 12/2023

OTHER PUBLICATIONS

ISA/220—Notification of Transmittal or Search Report and Written Opinion of the ISA, or the Declaration Mailed on Apr. 9, 2025 for WO Application No. PCT/US24/060087, 14 page(s).

*Primary Examiner* — Sohana Tanju Khayer
(74) *Attorney, Agent, or Firm* — Alston & Bird LLP

(57) ABSTRACT

Embodiments of the present disclosure provide methods, apparatuses, and computer program products configured to engage a mobile device with an electrical connector. Embodiments include a mobile device engagement system including one or more imaging devices, a robot arm, and at least one computing device. The one or more imaging devices are configured to capture one or more images of the mobile device. The robot arm includes an end effector configured to engage and facilitate positioning of the mobile device. The at least one computing device is configured to, using the one or more images, control the robot arm to engage the mobile device with the end effector, and control the robot arm to position and engage the mobile device with the electrical connector.

31 Claims, 11 Drawing Sheets

(51) Int. Cl.
*B25J 13/08* (2006.01)
*B25J 19/02* (2006.01)

(52) U.S. Cl.
CPC ........... *B25J 13/085* (2013.01); *B25J 19/023* (2013.01); *G05B 2219/40032* (2013.01); *G05B 2219/40082* (2013.01); *G05B 2219/40223* (2013.01)

(58) Field of Classification Search
CPC ........... G05B 2219/40032; G05B 2219/40082; G05B 2219/40223
See application file for complete search history.

(56) References Cited

U.S. PATENT DOCUMENTS 11,865,728 B2 * 1/2024 Kinoshita .............. B25J 13/085
11,904,481 B2 * 2/2024 Yamamoto ............... B25J 9/163
2014/0309775 A1 * 10/2014 Jenkinson ............... G01L 25/00 700/250
2016/0083199 A1 * 3/2016 Nishizaka ............ B65G 47/905 414/800
2017/0177538 A1 * 6/2017 Jiang ..................... G06F 13/385
2019/0126475 A1 * 5/2019 Kawanishi ............. B25J 9/1692
2019/0344447 A1 * 11/2019 Wicks .................. B25J 15/0691
2021/0060794 A1 * 3/2021 Naitou ................... B25J 9/1694
2021/0086913 A1 * 3/2021 Friedman ................ B60L 53/30
2021/0094190 A1 * 4/2021 Luo ...................... B25J 15/0625
2021/0122043 A1 * 4/2021 Menon ................... B25J 9/1633
2021/0178581 A1 * 6/2021 Yamamoto ............. G06V 20/20
2021/0228283 A1 * 7/2021 Abhari ...................... G06T 7/20
2022/0193918 A1 * 6/2022 Coon ..................... B25J 13/085
2023/0278195 A1 * 9/2023 Tanaami ................ B25J 9/0081
2024/0296216 A1 9/2024 Johnson et al.
2024/0313445 A1 * 9/2024 Oosaka .................. H01R 12/79
2024/0366327 A1 * 11/2024 Berman ................. A61B 34/20
2025/0005518 A1 * 1/2025 Cygan .................... G06V 20/52
2025/0065495 A1 * 2/2025 Asatani .................. B25J 9/1612
2025/0073910 A1 * 3/2025 Hayashi ................. B25J 9/1664
2025/0100154 A1 * 3/2025 Mizohana ................. G06T 7/74

* cited by examiner

ROBOT ENABLED MOBILE DEVICE MANIPULATION SYSTEM, METHOD, AND APPARATUS

CROSS-REFERENCE TO RELATED APPLICATIONS

This application claims the benefit of U.S. Provisional Application No. 63/615,068 entitled "ROBOT ENABLED MOBILE DEVICE MANIPULATION SYSTEM, METHOD, AND APPARATUS" and filed Dec. 27, 2023, and claims the benefit of U.S. Provisional Application No. 63/615,548 entitled "ROBOT ENABLED MOBILE DEVICE MANIPULATION SYSTEM, METHOD, AND APPARATUS" and filed Dec. 28, 2023, each of which is incorporated by reference herein in its entirety.

TECHNICAL FIELD

Embodiments of the present disclosure are generally directed to systems, apparatuses, and methods for performing one or more actions or processes on mobile devices using multi-axis robots. In particular, some embodiments of the present disclosure relate to computer vision systems and a robot enabled connection of a mobile device with an electrical connector.

BACKGROUND

There exist hundreds of thousands of mobile device (e.g., smartphones) SKUs, each with at least partially different features, including a variety of device shapes, sizes, operating systems (OSs), carriers, manufacturers (OEMs), and the like. In a large scale reverse-logistics environment, establishing electrical connections with each mobile device may be cumbersome and may serve as a bottleneck or otherwise hinder the efficiency and throughput of the reverse-logistics environment. Applicant has discovered various technical problems associated with conventional methods, systems, and apparatuses in such reverse-logistics environments. Through applied effort, ingenuity, and innovation, Applicant has solved many of these identified problems by developing the embodiments of the present disclosure, which are described in detail below.

BRIEF SUMMARY

Various embodiments of the present disclosure provide a mobile device engagement system for engaging the mobile device with an electrical connector. In various embodiments, the mobile device engagement system comprises one or more imaging devices configured to capture a first image and a second image of the mobile device, a robot arm comprising an end effector configured to engage and facilitate positioning of the mobile device, and at least one computing device configured to determine a position associated with the mobile device using the first image, control the robot arm to engage the mobile device with the end effector using the position associated with the mobile device, analyze the second image of the mobile device to determine a position of a port of the mobile device relative to the electrical connector, and control the robot arm to position the mobile device along an insertion axis defined by the electrical connector with the port of the mobile device aligned with the insertion axis, such that the port faces the electrical connector and translate the mobile device along the insertion axis to engage with the electrical connector.

In various embodiments, the mobile device engagement system further comprises a force sensor mounted on one of the robot arm or a station comprising the electrical connector, the force sensor configured to determine a force applied to the electrical connector and/or the station by the mobile device, wherein the at least one computing device is further configured to instruct the robot arm to stop translating the mobile device along the insertion axis toward the electrical connector when the force determined by the force sensor is higher than a force threshold.

In various embodiments, at least one computing device is further configured to determine an electronic connectivity issue between the port of the mobile device and the electrical connector in an instance in which the force is higher than the force threshold and an absence of an electronic coupling with the mobile device via the electrical connector is determined.

In various embodiments, at least one computing device is further configured to, when the electronic connectivity issue is determined, instruct the robot arm to move the mobile device away from the electrical connector, reposition the mobile device along the insertion axis of the electrical connector, and translate the mobile device along the insertion axis to engage with the electrical connector.

In various embodiments, at least one of the one or more imaging devices is configured to capture a third image of a screen of the mobile device after the mobile device engages the electrical connector and an electronic coupling to the mobile device is established, and wherein the at least one computing device is configured to determine a type and/or location of a prompt on the screen using the third image, and instruct a peripheral input device to interact with the mobile device using the type of the prompt and the location of the prompt.

In various embodiments, the mobile device engagement system further comprises a plurality of stations, each comprising a corresponding electrical connector, including a station comprising the electrical connector, wherein the at least one computing device is further configured to determine a type of the port of the mobile device using the second image, determine that the station is available, determine that the electrical connector is of a same type as the port of the mobile device.

In various embodiments, the one or more imaging devices are configured to image a code on the mobile device, wherein the at least one computing device is configured to determine a mobile device attribute using the code on the mobile device, and trigger a subsequent mode of operation of the mobile device using the mobile device attribute.

In various embodiments, the mobile device engagement system further comprises a mirror configured to reflect a mirror image of the code to a code imaging device of the one or more imaging devices such that imaging the code of the mobile device and capturing the second image of the mobile device can occur simultaneously and/or can occur when the mobile device is in a same location.

In various embodiments, the mobile device engagement system further comprises a conveyor belt configured to carry the mobile device from a first location to a proximity of the robot arm, the proximity being within reach of the robot arm, wherein the robot arm is configured to lift the mobile device from the conveyor belt, and place the mobile device on the conveyor belt or a second conveyor belt after a subsequent mode of operation of the mobile device is run, and wherein the conveyor belt or the second conveyor belt is configured to carry the mobile device to a second location.

In various embodiments, the mobile device engagement system further comprises a housing that houses the robot arm and the one or more imaging devices, wherein one or more of the at least one computing device are disposed in the housing or outside the housing.

Various embodiments of the present disclosure provide a computer-implemented method for engaging a mobile device with an electrical connector via a mobile device engagement system, the computer-implemented method comprising an engagement operation, wherein the engagement operation comprises at least capturing, by one or more imaging devices, a first image of the mobile device, determining, by at least one computing device using the first image, a position associated with the mobile device, engaging, by an end effector of a robot arm, the mobile device, capturing, by one or more imaging devices, a second image of the mobile device, analyzing, by the at least one computing device, the second image of the mobile device to determine a position of a port of the mobile device relative to the electrical connector, and controlling the robot arm to position the mobile device along an insertion axis defined by the electrical connector, with the port of the mobile device aligned with the insertion axis, such that the port faces the electrical connector, and translate the mobile device along the insertion axis to engage with the electrical connector.

In various embodiments, the computer-implemented method further comprises determining, by a force sensor, a force applied to the electrical connector by the mobile device during translation of the mobile device by the robot arm, wherein the force sensor is mounted on the station comprising the electrical connector, and instructing, by the at least one computing device, the robot arm to stop translating the mobile device along the insertion axis toward the electrical connector when the force determined by the force sensor is higher than a force threshold.

In various embodiments, the computer-implemented method further comprises determining, by the at least one computing device, an electronic connectivity issue between the port of the mobile device and the electrical connector in an instance in which the force is higher than the force threshold and an absence of an electronic coupling with the mobile device via the electrical connector is determined, and when the electronic connectivity issue is determined, instructing, by the at least one computing device, the robot arm to move the mobile device away from the electrical connector, reposition the mobile device along the insertion axis of the electrical connector, and translate the mobile device along the insertion axis to engage with the electrical connector.

In various embodiments, the computer-implemented method further comprises capturing, by at least one of the one or more imaging devices, a third image of a screen of the mobile device after the mobile device engages the electrical connector and an electronic coupling to the mobile device is established, determining, by the at least one computing device, a type and/or location of a prompt on the screen using the third image, and instructing, by the at least one computing device, a peripheral input device to interact with the mobile device using the type of the prompt and the location of the prompt.

In various embodiments, the computer-implemented method further comprises determining, by the at least one computing device using the second image, a type of the port of the mobile device, determining, by the at least one computing device, that a station among a plurality of stations is available, wherein each station comprises a corresponding electrical connector, including the station comprising the electrical connector, and determining, by the at least one computing device, the electrical connector is of a same type as the port of the mobile device.

In various embodiments, the computer-implemented method further comprises imaging, by a code imaging device, a code on the mobile device, determining, by the at least one computing device, a mobile device attribute using the code on the mobile device, and triggering, by the at least one computing device, a subsequent mode of operation of the mobile device using the mobile device attribute.

Various embodiments of the present disclosure provide an apparatus for engaging a mobile device with an electrical connector via a mobile device engagement system, the apparatus comprising at least one processor and at least one non-transitory memory including computer-coded instructions thereon, the computer coded instructions, with the at least one processor, cause the apparatus to capture, using one or more imaging devices, a first image of the mobile device, engage, using an end effector of a robot arm, the mobile device, capture, using one or more imaging devices, a second image of the mobile device, and control the robot arm to position the mobile device along an insertion axis defined by the electrical connector, with the port of the mobile device aligned with the insertion axis based on an offset determined using the second image, such that the port faces the electrical connector, and translate the mobile device along the insertion axis to engage with the electrical connector.

In various embodiments, the computer coded instructions further cause the apparatus to in response to a signal indicative of an electronic connectivity issue, control the robot arm to move the mobile device away from the electrical connector, reposition the mobile device along the insertion axis of the electrical connector, and translate the mobile device along the insertion axis to engage with the electrical connector.

In various embodiments, the computer coded instructions further cause the apparatus to based on a type and/or location of a prompt on a screen of the mobile device, instruct a peripheral input device to interact with the mobile device using the type of the prompt and the location of the prompt.

In various embodiments, the computer coded instructions further cause the apparatus to determine, by a force sensor, a force applied to the electrical connector by the mobile device during translation of the mobile device by the robot arm, wherein the force sensor is mounted on the station comprising the electrical connector, and instruct the robot arm to stop translating the mobile device along the insertion axis toward the electrical connector when the force determined by the force sensor is higher than a force threshold.

DETAILED DESCRIPTION

Overview

Figure 1:
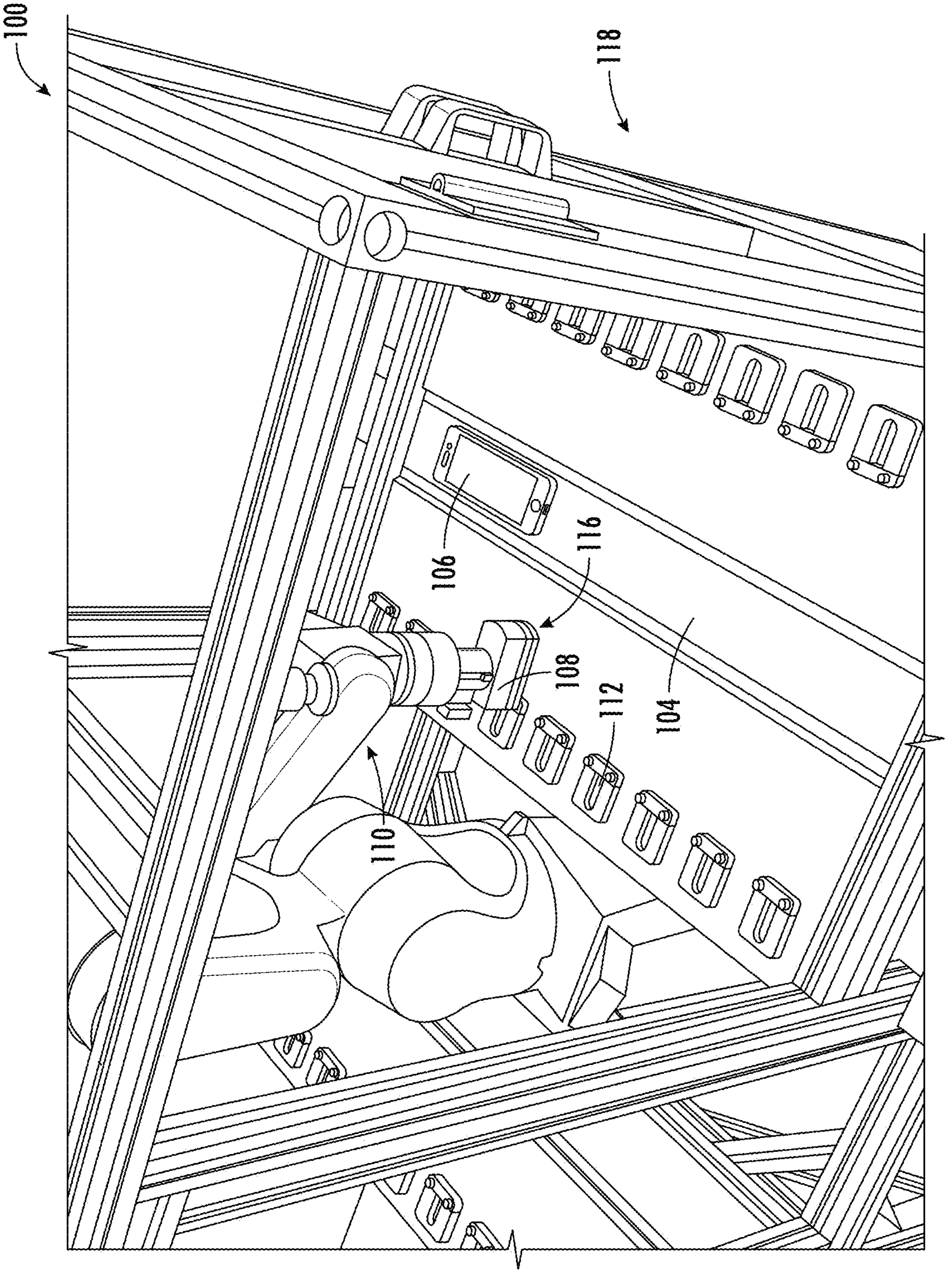
FIG. 1 is a perspective view of a mobile device engagement system, including a robot arm, conveyor, and multiple stations, in accordance with various embodiments of the present disclosure.

Various embodiments of the present disclosure provide systems, methods, and apparatuses for engaging a mobile device with an electrical connector. In some embodiments, mobile devices may be conveyed to the engagement system using a conveyor belt and conveyed away using the same or a different conveyor belt and/or other similar means. In some examples, the systems, methods, and/or apparatuses described herein may be used in a reverse-logistics facility that processes, refurbishes, tests, repairs, diagnoses, grades, cleans, wipes, or performs similar or related operations on mobile devices.

Engagement systems according to various embodiments of the present disclosure may use a robot arm (e.g., a six-axis robot arm) to grip a mobile device (e.g., from a conveyor) and engage the mobile device with an electrical connector. The electrical connector may establish an electronic coupling (e.g., a data connection) between the mobile device and one or more computing devices. In various embodiments, the electronic coupling may enable one or more subsequent modes of operation of the mobile device. A subsequent mode of operation may include at least one of a charging mode, software installation mode, debugging mode, data wiping mode for the mobile device, and/or any other mode of operation that may be enabled on a mobile device after electronically coupling with an electrical connector. For example, the electronic coupling (e.g., a data connection) to the electrical connector may enable the mobile device to be charged and/or enable the one or more computing devices (e.g. by installing a software, using the mobile device operating system, and/or using a debug mode) to determine a charge level or a charging state (e.g. whether the mobile device is charging or not), perform one or more operations on, retrieve one or more sets of data from the mobile device, etc. In various embodiments, two or more modes of operation may be enabled on the mobile device after electronically coupling (e.g. including a data connection) with the electrical connector. In some embodiments, the one or more computing devices may trigger the subsequent mode of operation by causing the mobile device to perform a preprogrammed function of the mobile device (e.g., factory reset, USB debugging mode, etc.) via one or more commands input via the device touchscreen interface and/or the electrical connector (e.g., via simulated USB device). Examples of operations performed on and/or by a mobile device via an electrical connector are discussed in U.S. application Ser. No. 18/177,484 filed Mar. 2, 2023, which application is incorporated by reference herein in its entirety.

The engagement systems, methods, and apparatuses may use one or more imaging devices to determine location, dimensions, and/or a geometric center of at least one surface of the mobile device.

In various embodiments, a first imaging device is used to capture a first image of the mobile device. In an example, a light source (e.g., an IR, NIR, or visible light source) emits light onto the mobile device and an imaging device (e.g., a first imaging device) may be configured to capture an image (e.g., a first image) of the illuminated mobile device. The imaging device may be configured to detect electromagnetic waves in the spectrum associated with the light source. In various embodiments, the first imaging device captures the first image using visible light and/or ambient light (e.g., without a flash or dedicated light source).

One or more computing devices may be configured to determine the location, dimensions, and/or the geometric center of at least one surface (e.g., an upward-facing surface) of the mobile device by analyzing (e.g., measuring) the representation of the mobile device in the first image. For example, the computing device(s) may analyze the first image to determine a two- or three-dimensional location of the mobile device and an orientation of the mobile device on the conveyer belt (e.g., rotational orientation). In some embodiments, computing device(s) may analyze the first image to determine the width, length, and/or geometric center of at least one surface of the mobile device. In some examples, a geometric center of the mobile device may be measured using the first image and/or calculated using other measured dimensions of the mobile device.

In various embodiments, at least one computing device may use the location, dimensions, and/or the geometric center of the mobile device to instruct a robot arm to engage the mobile device by targeting a predetermined location on the mobile device (e.g., the geometric center). The robot arm may use an end effector to engage the mobile device at the target location (e.g., by engaging the end effector with the mobile device at the geometric center). For example, an end effector of the robot arm may comprise a suction tool supplied with a vacuum from a compressor to engage the mobile device at and/or surrounding the geometric center of the surface of the mobile device for manipulating the mobile device with the robot arm. In some examples, the end effector may include a gripper that engages the mobile device at the edges of the mobile device using the location, dimensions, and/or geometric center of the mobile device. In various embodiments, the end effector may be any known tool capable of engaging a mobile device. In some embodiments, the end effector may engage the front surface (e.g., the screen side) of the mobile device. In some embodiments, the end effector may engage the mobile device such that the front surface (e.g. the screen side) of the mobile device faces the end effector.

In various embodiments, the robot arm is configured to lift the mobile device from the conveyor. The robot arm may then position the mobile device such that the one or more imaging devices capture a second image of the mobile device (e.g., either the same imaging device as the first image or a different imaging device). In various embodiments, a second imaging device captures the second image.

Although referred to for consistency as a "second image", the second image may be captured independently by the one or more imaging devices in some embodiments without requiring additional images. The second image may but is not required to follow the first image. Likewise, the first image may but is not required to be followed by the second image. The same applies for the first imaging device, second imaging device, and the like.

The second image may include an image of a port of the mobile device. One or more computing devices may use the second image to determine a location of the port of the mobile device, which may be used to direct the robot arm to engage the mobile device with an electrical connector. In some embodiments, the location of the port and/or mobile device may be determined with respect to an origin point. In some embodiments, the origin point may be any arbitrary fixed reference point. In some embodiments, the origin point may be calibrated relative to the robot arm and/or one or more imaging devices for consistent movement and placement of the mobile device(s) on one or more stations. For example, the origin point may be a point in a coordinate system associated with the port of a calibrated mobile device that will be aligned with the electrical connector upon movement of the robotic arm. Said differently, during capture of the second image, the robot arm may move the mobile device to a preset location within the field of view of an imaging device (e.g., the second imaging device). For a calibration mobile device (e.g., a test mobile device used to calibrate the origin), the origin may be the location of the port in the preset location. Using the origin point, the computing device determines an offset of the port of a subsequently-examined mobile device relative to the origin point and instructs the robot arm to adjust the position of the mobile device during engagement with the electrical connector according to the offset. In some embodiments, the offset may be determined in one-, two-, or three-dimensions (e.g., three axes of a cartesian coordinate system). In some embodiments, the robot arm may use an initial rotational orientation of the mobile device determined based on the first image or a subsequently determined orientation (e.g., based on the second image) to rotationally align the mobile device with the origin. In some embodiments, the robot arm may use a rotational and/or linear movement of the mobile device in one-, two-, or three-dimensions to align the mobile device with the origin point. In some embodiments, the robot arm may align the mobile device with the origin point while holding the mobile device in various locations, such that but not limited to, in a location where the second image is captured, in a location proximate to the electrical connector, etc.

In various embodiments, one or more computing devices associated with the system use the second image to also determine a type of the port of the mobile device. For example, using image recognition, the one or more computing devices determine whether the port of the mobile device is a USB-C® port or a Lightning® port. In other embodiments, the type of port may be retrieved from a database (e.g., in connection with a unique identifier (UID) code, serial number, IMEI, or any other code on the device).

In various embodiments, a code imaging device (e.g., a camera, dedicated bar code scanner, or other imaging devices) images a code on the mobile device (e.g., a UID code on a rear surface of the device). The computing device uses the code to determine a mobile device attribute for example an operating system, make, model, unique identifier, or the like of the mobile device. The code and/or mobile device attribute may be used for determining one or more subsequent processes to be performed on the mobile device and/or for tracking the mobile device through the reverse-logistics environment. In various embodiments, while the one or more imaging devices capture the second image, the imaging device images a code on the mobile device. In some embodiment, the second imaging device, the first imaging device, and/or the code imaging device may be a single device or multiple devices. In an example, the code imaging device and the second imaging device may be placed adjacent to each other to capture the second image and read the code at the same time or close in time without relocating the mobile device. In some embodiments, a mirror may be used to reflect an image of the code on the mobile device to the code imaging device (e.g., in an instance in which the code is facing at least partially away from the code imaging device).

In some embodiments, the system may include multiple electrical connectors, with the robot arm being configured to engage mobile devices with each electrical connector. In some embodiments, multiple robot arms may be used in one or more housings to process additional mobile devices in parallel. The engagement system may include one or more stations each having a corresponding electrical connector. One or more computing devices associated with the system may be electronically coupled to and in communication with the one or more stations. The computing device(s) collects and stores in non-transitory memory availability information from the one or more stations (e.g., detecting an electronic coupling (e.g., a data connection) with a mobile device at the corresponding electrical connector, detecting a force directly or indirectly on a station or a data connector using a force sensor (for example a force above a certain force threshold using a sensor in the robotic arm or on the station), storing a log of stations that have been assigned a mobile device in memory, and/or other software and/or hardware-based collection). In various embodiments, the computing device may collect the availability information from the one or more stations in real time and/or intermittently. A station of the one or more stations may be available when no mobile device is engaged with the station.

In various embodiments, the computing device may collect and store in non-transitory memory electrical connector type information from the one or more stations. For example, the computing device may collect information indicating whether a station of the one or more stations includes a USB-C® type electrical connector or a Lightning® type electrical connector. In some embodiments, the electrical connector type information may be preset in memory (e.g., during an initial setup or calibration process), may be collected through communication with the one or more stations (in real time, intermittently, or during the initial set-up), or may be determined by the one or more computing devices executing a computer vision operation (e.g., using visual recognition by comparing the image of the connector to one or more known images).

In various embodiments, the one or more computing devices may assign a given mobile device to one of the available stations with an electrical connector of a same type as the port of the mobile device. In some embodiments, using the offset of the port of the mobile device with the electrical connector, the one or more computing devices (e.g., a controller, such as a programmable logic controller, or another computing device within or external to the housing comprising the robot arm) instructs the robot arm to adjust the position of the mobile device to counter the offset before the robot arm lowers the mobile device from the predetermined location to a position in front of the electrical connector (e.g., along an insertion axis for the connector). In some embodiments, using the offset of the port of the mobile device with the electrical connector, the one or more computing device(s) instructs the robot arm to adjust the position of the mobile device to counter the offset after the robot arm lowers the mobile device to a location in front of the electrical connector (e.g., along an insertion axis for the connector).

After the port of the mobile device is aligned with the electrical connector, the robot arm is configured to translate the mobile device toward the station such that the electrical connector is engaged with the port of the mobile device (e.g., translate along the insertion axis of the electrical connector).

In various embodiments, one or more force sensors (e.g., a force torque sensor) are mechanically coupled to the robot arm and/or the station. The force sensor is configured to determine a force applied between the mobile device and the electrical connector at least along an insertion axis. The computing device may use the force determined by the force sensor to determine how far to translate the mobile device toward the electrical connector to prevent damage to the mobile device and/or the station, such as by detecting a threshold force predetermined to be indicative of a successful connection. In some embodiments, the one or more computing devices may use an electronic coupling (e.g., a data connection) established with the mobile device via the electrical connector as an indicator of a successful connection either alone or in combination with the force sensor threshold force reading.

In some embodiments, when the force sensor detects a force below the threshold force, the one or more computing devices instruct (or continue instructing, or permit the robot arm to continue a previous instruction) the robot arm to translate (or continue translating) the mobile device toward the electrical connector. In some embodiments, when the force sensor detects a force above the threshold force, the one or more computing devices instruct the robot arm to stop translating the mobile device toward the electrical connector. The one or more computing devices may evaluate a successful connection with the electrical connector using data connection at any stage during the process and instruct the robot arm to stop translating the mobile device toward the electrical connector once a successful connection is established.

In various embodiments, after engaging the port of the mobile device with the electrical connector, the computing device determines a successful communication with the mobile device (e.g., by receiving signals from the mobile device over the electrical connector) and executes one or more software steps on the mobile device. For example, the one or more computing devices may install an application for diagnostics, perform data wiping, factory resetting, etc., on the mobile device. In some examples, the computing device run the operating system of the mobile device for example in a debug mode.

In some examples, after determining the successful communications with the mobile device, the one or more computing devices perform data wiping on the mobile device to erase any consumer data and/or data non-essential to the operation of the mobile device. For example, the one or more computing devices may remove any setting data such as display font, brightness, color scheme, etc. In some examples, the one or more computing devices may remove any data other than the factory setting(s) on the mobile device. The one or more computing devices may run a command in the operating system of the mobile device to wipe data and rest the mobile device to the factory setting(s).

After completion of the software steps, the robot arm may remove the mobile device from the electrical connector and place the mobile device on a conveyor for outfeed.

In various embodiments, the one or more imaging devices are configured to capture an image (e.g., a third image) of the mobile device after engagement between the mobile device and the electrical connector and establishment of an electronic coupling (e.g., a data connection). For example, a third imaging device captures the third image of the mobile device before, during, or after execution of the software steps. The third image includes a screen of the mobile device displaying various prompts on the mobile device. In various embodiments, the prompt may be an indication or an icon indicating a charge level and/or charging state of the mobile device.

The computing device uses the third image to determine a corresponding action that needs to be taken according to the prompt or lack thereof (for example when the prompt shows a sufficient charge level of the mobile device). In various embodiments, the one or more computing devices determine the corresponding action, or lack thereof by a machine learning model configured to analyze the prompt and the position of the prompt on the screen to determine a next action to be taken. In some embodiments, the machine learning model may classify a current state of the screen of the mobile device or a portion thereof (e.g., a prompt) to determine the next action to be taken according to one or more objectives. In some embodiments, the machine learning model may be configured to classify the current state of a graphical user interface shown on the screen. For example, the next action that needs to be taken may be accepting a prompt to allow a software to be installed on the mobile device. For example, the next action that needs to be taken may be accepting a prompt for the mobile device to enter a debug mode of operation. For example, the next action that needs to be taken may be accepting a prompt to allow the operating system of the mobile device and/or an installed software to wipe data from the mobile device. Similarly, in some embodiments, the model may be configured to determine that a prompt must be dismissed before subsequent action can be taken (e.g., if a prompt showing a sufficient charge level appears, the model may determine the next action as dismissing the prompt prior to further action being taken).

In various embodiments, the engagement system includes a peripheral input device to interact with the mobile device during execution of one or more software steps. For example, the peripheral input device may interact with the mobile device in response to the computer device(s) analyzing and determining the type of the prompt and/or the location of the prompt on the screen. Similarly, any of the aforementioned computer vision processes may inform the control instructions sent by the one or more computing devices to cause interaction of the peripheral input device with the mobile device. For example, the prompt may request authorization to proceed with wiping data from the mobile device. The computing device may determine an appropriate response to the prompt and the appropriate way to communicate the response to the mobile device.

For example, the peripheral input device may be a tapping device (e.g., controlled by the robot arm or another actuating device) and one or more computing devices may direct the tapping device to physically tap the appropriate prompt on the screen of the mobile device. The tapping device may be mechanically coupled to the robot arm or to a different robot arm. In some examples, the peripheral input device may be a software (e.g., a simulated input device) interacting with the mobile device by communicating the appropriate response to the mobile device over the electrical connector, such as by simulating mouse inputs, touchscreen touches, and/or keyboard strokes on the mobile device. In some embodiments, the peripheral input device may include a physical input device (e.g., a keyboard) coupled with the mobile device directly or indirectly via the electrical connector.

Definitions

The phrases "in one embodiment," "according to one embodiment," "in some embodiments," "in various embodiments" and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration" without a limitation. Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Use of broader terms such as "comprises," "includes," and "having" should be understood to provide support for narrower terms such as "consisting of," "consisting essentially of," and "comprised substantially of". Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The term "electronically coupled," "electronically coupling," "electronically couple," "in electronic communication with," or "electronically connected" in the present disclosure refers to two or more elements or components being electronically connected, directly or indirectly. For example, two or more elements or components may be connected through wired means and/or wireless means, such that signals, voltage/current, data, information, or any other electronic signals may be transmitted to and/or received from these elements or components. Electronic connections established via an electrical connector and/or port may refer to wired connections.

The term "mechanically coupled" in the present disclosure refers to two or more mechanical elements (for example, but not limited to, a frame, a surface, a support unit, a joint, etc.) being physically connected in various ways such as directly, through intermediary elements, and/or using fastener(s), clasps, clamps, joints, pin joint, axle, hinge, adhesive, etc. The term "mechanically coupled" may refer to any of movable, turntable, swiveling, pivoting, fixed, and/or stationary mechanical coupling and/or any other similar type of mechanical coupling. In a non-limiting example, two components are mechanically coupled using a force, such as but not limited to magnetic force, force caused by air pressure, adhesive force, mechanical force, and/or other similar or related forces.

The term "mobile device" refers to any portable computing device, such as, but not limited to, a portable digital assistant (PDA), mobile telephone, smartphone, or tablet computer with one or more communications, networking, and/or interfacing capabilities. Non-limiting examples of communications, networking, and/or interfacing capabilities include CDMA, TDMA, 4G, 5G, NFC, Wi-Fi, Bluetooth, as well as hard-wired connection interfaces such as USB, Thunderbolt, and/or ethernet connections.

The term "mobile device attribute" refers to any data related to a mobile device, including, but not limited to, a mobile device manufacturer, a mobile device model, a mobile device operating system, a mobile device software version, a current access permission level, mobile device dimensions, a grade, a combination thereof, and/or similar attributes.

The term "code on a mobile device" refers to any data uniquely identifying the mobile device attribute. The "code on the mobile device" includes, but is not limited to, a unique identifier (UID) code, serial number, an IMEI, a barcode (including one- and two-dimensional bar codes indicative of any other code), a quick response (QR) code (including QR codes indicative of any other code), text including letters and/or numbers, and/or any other machine readable code.

The term "peripheral input device" refers to one or more input devices, whether such devices are physical devices and/or electronically simulated to give the appearance of a physical device to a mobile device. A physical input device may include any physical device that is capable of providing an input to the mobile device by touching a screen of the mobile device. For example, an end of the physical input device may include material that, when in physical contact with the screen, can imitate touching the screen of the mobile device or provide input to the mobile device. One or more peripheral input devices may be employed in connection to the mobile device, whether such connection is via physical connector (e.g., physical connector of a physical input device and/or physical connector associated with the computing device which simulates an input device over the physical connector) or otherwise. A peripheral input device may be electronically simulated using at least one computing device and interact with the mobile device during execution of one or more software steps. In a non-limiting example, the peripheral input device may interact with the mobile device in response to the at least one computing device analyzing and determining a type of a prompt and/or the location of the prompt on the screen of the mobile device. The at least one computing device may determine an appropriate response to the prompt and the appropriate way to communicate the response to the mobile device. For example, the at least one computing device may interact with the mobile device by communicating the appropriate response to the mobile device over the electrical connector, such as by simulating mouse inputs, touchscreen touches, and/or keyboard strokes on the mobile device.

Non-limiting examples of peripheral input devices include a tapping device, a touch device, a touch pen, a stylus, computer keyboards, computer mice, microphones, joysticks, touchpads, trackballs, a software run by the at least one computing device, and any other peripheral input devices capable of manipulating the mobile device whether electronically simulated or generated by physical corresponding input devices.

The term "imaging device" refers to a device configured to capture one or more portions of image data, collect distance and/or dimension data, scan a code data, etc., including data related to, but not limited to, a mobile device. An imaging device may include various types of cameras such as a photographic and/or videographic camera, a one-two- or three-dimensional camera, a LIDAR imaging device, a radar imaging device, a sound-wave imaging device, a barcode reader, a two-dimensional scanner, a three-dimensional scanner, an optical scanner, a laser scanner, an infrared scanner, (each of the foregoing examples not necessarily being mutually exclusive) or any other device capable of imaging the object for one or more of the respective functions described herein. The imaging device may function using various light wavelengths, for example, but not limited to, visible light wavelengths, infrared (IR) light wavelengths, and/or Ultra Violet (UV) light wavelengths. The imaging device may function using a light source and/or using ambient light.

In various contexts, the imaging device can capture one or more types of image data including, but not limited to, one or more still photos, one or more bursts photos, one or more videos that can be directly or indirectly used to make a continuous image of the edge of the object, one or more point cloud, distance and/or dimension data, data embedded in an image such as but not limited to a code and/or other types of similar data. In various contexts, an image of a mobile device captured by the one or more imaging devices may be any of a photographic image, (such as a JPEG, HEIF, TIFF, RAW, DNG, PNG, GIF, BMP, etc., image), a frame of a video (such as a MP4, MOV, WMV, AVI, AVCHD, FLV, F4V, SWF, MKV, WEBM, HTML5, etc., video), a point cloud, scanned data code stored in a form of a file containing data embedded in a code, and/or any other type of image or data file.

In some embodiments, a imaging device that is used for determining one or more dimensional attributes may comprise a different imaging device technology or the same imaging device technology (or may be the same imaging device) than a imaging device configured to capture image data related to location, coordinates, type, etc., of the mobile device or various features of the mobile device such as a port of the mobile device, or an imaging device configured to image a code of the mobile device. Further, any of the aforementioned imaging device(s) may comprise a different imaging device technology or the same imaging device technology (or may be the same imaging device) than an imaging device configured to capture an image of the screen of a mobile device to perform any image recognition and/or analysis.

The term "computing device" refers to any computer, controller (such as a microcontroller), processor, circuitry, and/or other executor of computer instructions that is embodied in hardware, software, firmware, and/or any combination thereof, that enables access to myriad functionalities associated with one or more mobile device(s), system(s), and/or one or more communications networks. Non-limiting examples of a computing device include a computer, a controller (such as a microcontroller), an application-specific integrated circuit, a field-programmable gate array, a personal computer, a smart phone, a laptop, a fixed terminal, a server, a networking device, a virtual machine, a processor, a plurality of processors electronically coupled to each other and placed in proximity of each other, remote from each other, in a various groups or bundles of one or more processors, and/or forming cloud computing or processing, etc. Other examples of computing devices are provided herein.

The term "data connection" refers to an electronic coupling between the two components that allows for data signals to be transmitted between them in one or both directions. In a non-limiting example, an electrical connector may be electronically coupled with a port of a mobile device and the data connection may exist between the electrical connector and the mobile device when data signals are able to transmit between the electrical connector and the port of the mobile device.

The term "electrical connector" refers to a connector that comprises a conductive material and is configured to mechanically and electronically couple with, for example, a port of a mobile device and, in some instances, a data connection. In a non-limiting example, the electrical connector may be a connector or a plug that is configured to be inserted in and electrically coupled to a port of a mobile device to provide electrical and data connection to and/or from the mobile device. Non-limiting examples of an electrical connector includes a USB connector, a USB-C® connector, a USB Micro-B connector, a Lightning® connector, and/or similar connectors.

The term "port" refers to a receptacle, jack, or socket configured to mechanically and electronically couple with, for example, an electrical connector. In some embodiments, the electrical connector may at least partially insert into the port. In a non-limiting example, a port on a mobile device may be used for charging and/or data transfer to/from the mobile device. Non-limiting examples of a port include USB port, a USB-C® port, a USB Micro-B port, a Lightning® port, and/or similar ports.

The term "end effector" refers to a device including an engagement mechanism configured to engage an object such as a mobile device. In a non-limiting example, the end effector may for example include a suction device, a gripper, a grabbing tool, and/or other similar means. For example, an end effector of the robot arm may comprise a suction tool supplied with a vacuum from a compressor. In some examples, the end effector may include a gripper that pinches or otherwise grasps a target device. In various embodiments, the end effector may be any known tool capable of engaging a mobile device. In some examples, the end effector may include other components, such as sensors. For example, an end effector may include a force sensor (such as a force torque sensor) and/or a pressure sensor configured to sense an amount of force/pressure applied to the engaged object.

The terms "engage", "engaging", or "engagement" refer to a mechanical contact or other interaction, including coupling, whether direct or indirect, between two or more components.

The term "force sensor" refers to an electrical, mechanical and/or electro-mechanical device configured to cause a detectable signal or change in signal indicative of a force applied to it or to a substrate to which the force sensor is applied. In some embodiments, the force sensor may generate or modify electromagnetic signals (e.g., via a change in resistance, current, voltage or the like, such as a strain gauge) configured to be received, detected, and/or quantified by a computing device. In some embodiments, the force sensor may be configured to output a measurement associated with the force (e.g., lbs of force). In various embodiments, the force sensor is configured to generate a signal to facilitate monitoring or detection of linear and/or rotational forces. In a non-limiting example, the force sensor is a force torque sensor, a pressure sensor, a multi-axis (e.g. a six axis) sensor, and/or similar sensors.

The term "station" refers to a docking area, location, site, terminal, base, etc., where the electronic connector is mounted, mechanically coupled to, or otherwise capable of interacting with a mobile device. In various embodiments, the station is configured to support and/or mechanically couple to the mobile device while the mobile device engages with the electrical connector.

As used herein, the terms "data," "content," "digital content," "digital content object," "information," and similar terms may be used interchangeably to refer to data capable of being transmitted, received, created, modified, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

The term "navigational state" refers to a specific configuration of interface attributes rendered on the display of a mobile device representing a current location within the mobile device menu hierarchy associated with the mobile device. For example, a navigational state of a mobile device may comprise a state associated with a settings menu in an instance in which the device is currently displaying the settings menu.

The term "navigational input command" refers to an input command issued to a mobile device or configured to be issued to a mobile device. In some embodiments, the navigational input command may be configured to navigate the mobile device to a different location within the mobile device menu hierarchy thereby causing the mobile device to enter into a different navigational state. Navigational input commands may be commands associated with one or more peripheral input devices such as, but not limited to, computer keyboard entries, computer mouse interactions, touchscreen/touchpad entries, microphone input, touchpad interactions, trackball interactions, and/or other inputs, whether electronically simulated or generated by physical corresponding input devices. In some embodiments, navigational input commands comprise input commands, whether simulated or real, associated with a human interaction with an electronic interface of the mobile device such as, but not limited to, a finger press on the electronic interface, a combination of multiple, simultaneous finger presses on the electronic interface, a sequence of finger presses on the electronic interface, and a swipe along the electronic interface. In some embodiments, navigational input commands comprise input commands, whether simulated or real, associated with a human interaction with one or more physical buttons integrated with the mobile device such as, but not limited to, a press of the one or more physical buttons, and a combination of simultaneous presses of the one or more physical buttons.

The term "navigational input command sequence" refers to a sequence of navigational input commands. In some embodiments, a navigational input command sequence may be directed towards elevating the access permission level of a mobile device. In various embodiments, the navigational input command sequence must be executed in strict order for the access permissions to be elevated. In some embodiments, the navigational input command sequence is a collection of navigational input commands whose order is determined by the one or more navigational states associated with the mobile device in order to elevate the access permission level of the mobile device.

The term "trained machine vision model" refers to an algorithmic, statistical, and/or machine learning model that can detect, extract, and/or otherwise derive particular data from image data. Non-limiting examples of a trained machine vision model include a trained neural network, a trained machine learning model, a trained artificial intelligence, and/or at least one image process algorithm. In various embodiments, the trained machine vision model is trained using image data captured by one or more imaging devices such as cameras. Said image data can include, but is not limited to, image data related to one or more mobile devices, a port of a mobile device, one or more mobile device attributes, one or more interface attributes, one or more navigational states, and/or data related to the mobile device menu hierarchy of a particular mobile device. In some embodiments, the image data captured by one or more imaging devices is associated with one or more dimensions of a mobile device, one or more coordinates associated with a mobile device, one or more relative location associated with a port of a mobile device, a type of a port of the mobile device, a code on a mobile device, one or more navigational states and/or one or more navigational input commands of the navigational input command sequence.

"Executable code" refers to a portion of computer program code storable and/or stored in one or a plurality of locations that is executed and/or executable via one or more computing devices embodied in hardware, software, firmware, and/or any combination thereof. Executable code may define at least one particular operation to be executed by one or more computing devices. In some embodiments, a memory, storage, and/or other computing device includes and/or otherwise is structured to define any amount of executable code (e.g., a portion of executable code associated with a first operation and a portion of executable code associated with a second operation). Alternatively or additionally, in some embodiments, executable code is embodied by separate computing devices (e.g., a first data store embodying first portion of executable code and a second data store embodying a second portion executable code).

"Data store" refers to any type of non-transitory computer-readable storage medium. Non-limiting examples of a data store include hardware, software, firmware, and/or a combination thereof capable of storing, recording, updating, retrieving and/or deleting computer-readable data and information, whether embodied locally and/or remotely and whether embodied by a single hardware device and/or a plurality of hardware devices.

Example Embodiments

Referring now to FIG. 1 illustrates various aspects of a mobile device engagement system 100 is provided in accordance with various embodiments of the present disclosure.

In various embodiments, the mobile device engagement system 100 includes a conveyor belt 104. The conveyor belt 104 may be configured to carry a mobile device 106 from a first location to a proximity of a robot arm. The first location may refer to a collection location, storage location, sorting location, etc., of a mobile device. For example, the first location may be any location inside or outside the reach of the robot arm and the proximity of the robot arm may refer to the area within the reach of the robot arm. In various embodiments, the mobile device engagement system 100 is placed within a housing 118. The first location may be any location outside the housing 118.

In various embodiments, the housing 118 may be configured to enclose one or more components of the mobile device engagement system 100. The housing 118 may be configured to protect various components of the mobile device engagement system 100. The housing 118 may be closed, open, or partially open. The housing 118 may be transparent or include transparent sections.

The mobile device engagement system 100 may include a robot arm 110 fully or partially placed in the housing 118. In various embodiments, the robot arm 110 may be a multi-axis robot arm, for example a two-, three-, four-, five-, or six-axis robot arm. In some examples, the robot arm may include a higher number of rotation axes. The robot arm 110 may comprise an end effector 108.

In various embodiments, the end effector 108 may be configured to engage and facilitate positioning of the mobile device 106. The end effector 108 may be mechanically coupled to an end of the robot arm 110 and include a mechanism 116 (such as suction device, a gripper, a grabbing tool, and/or other similar means) to engage the mobile device 106. After the end effector 108 engages the mobile device 106, the robot arm 110 may move the mobile device 106 to various other positions and/or locations. The robot arm 110, using the end effector 108, may also orient the mobile device 106 in various directions, for example in any direction in the three-dimensional spherical coordinates.

In various embodiments, the robot arm 110 is configured to lift the mobile device 106 from the conveyor belt 104, and place the mobile device 106 on the conveyor belt or a second conveyor belt after a subsequent mode of operation of the mobile device (such as charging, charge level testing, a software install, data wiping, running the mobile device in a debug mode, etc.) is run as further described below.

In various embodiments, the conveyor belt or the second conveyor belt is configured to carry the mobile device to a second location. The second location may refer to another collection location, storage location, sorting location, or a packing location, etc., of a mobile device. In various embodiments, the second location may be out of the reach of the robot arm. In various embodiments, the second location may be any location outside the housing 118.

Figure 2:
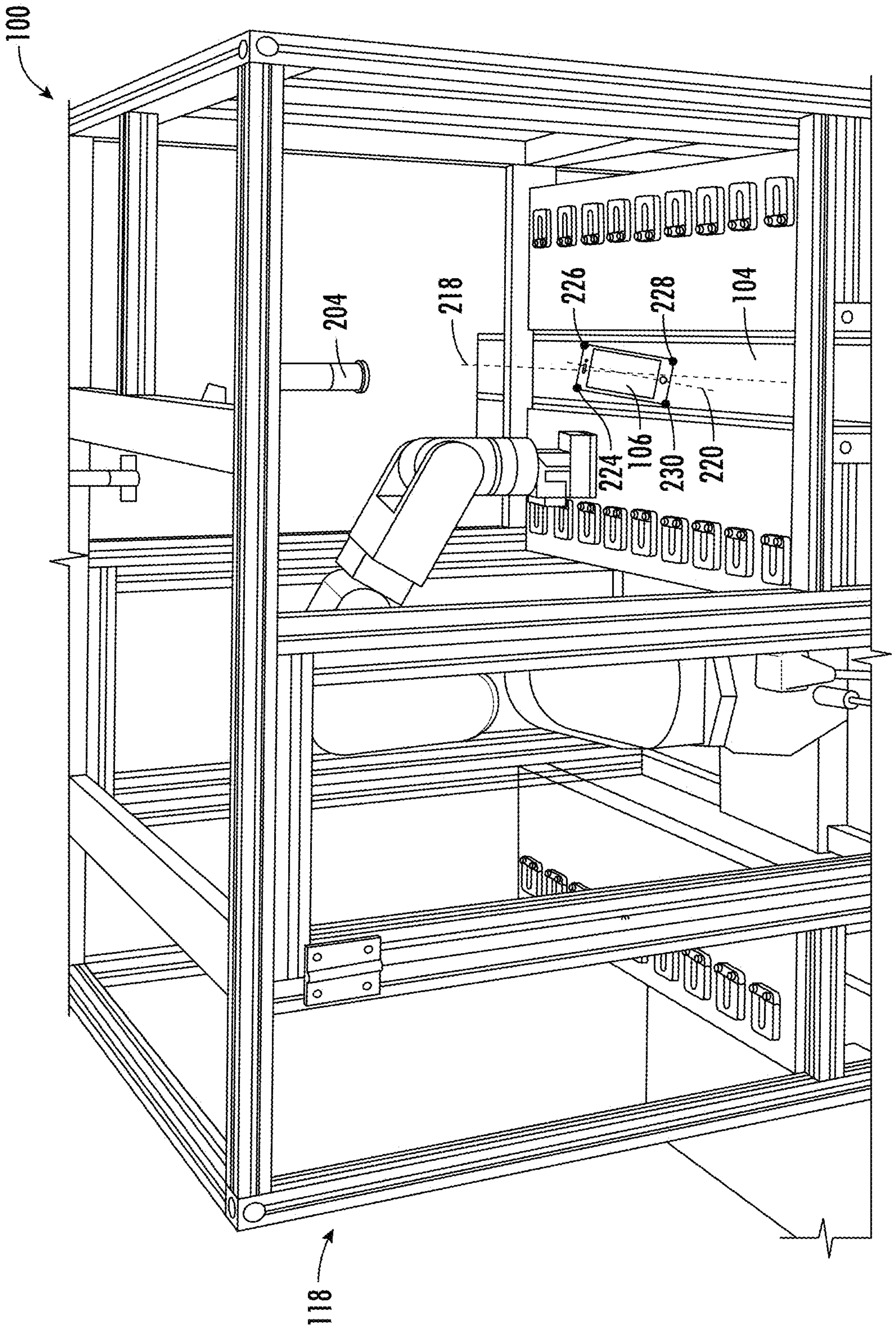
FIG. 2 is a side view of a mobile device engagement system, in accordance with various embodiments of the present disclosure.

In various embodiments, the mobile device engagement system 100 is configured to engage a mobile device 106 with an electrical connector on a station of a plurality of stations for example station 112. The plurality of stations may be arranged in one or more banks of stations inside the housing 118. For example as shown in FIG. 1, each bank of stations may comprise a plurality of stations arranged in a row. In an example, the stations are arranged in one or more rows on each side of the conveyor belt 104. In some examples, the stations are arranged in one or more rows on each side of the robot arm 110. For example, in FIG. 2, three rows of stations 112 are shown, two on a first side of the robot arm 110 and a third on a second side of the robot arm. Each of the stations 112 depicted in FIG. 2 are within reach of the robot arm 110. However, the plurality of stations may be arranged in any other fashions and not limited to the examples explicitly described.

In various embodiments, the mobile device engagement system 100 may include one or more imaging devices configured to capture one or more images of the mobile device 106. In various embodiments, the mobile device engagement system 100 may include or be electronically coupled to at least one computing device. The one or more computing device are further illustrated with reference to FIG. 11.

In various embodiments, the one or more computing device is electronically coupled to the one or more imaging device. The one or more computing device may instruct the one or more imaging device to capture a first image of the mobile device. In various embodiments, the computing device may determine a position, dimensions, and/or orientation associated with the mobile device 106 using the first image, as for example described with reference to FIG. 2. In various embodiments, the computing device may control the robot arm 110 to engage the mobile device 106 with the end effector 108 using the position associated with the mobile device.

In various embodiments, the one or more computing device may instruct the one or more imaging device to capture a second image of the mobile device. The computing device may analyze the second image of the mobile device to determine a position of a port of the mobile device 106 relative to a position of an electrical connector in the one or more stations. The computing device may be configured to control the robot arm to position the mobile device 106 along an insertion axis defined by the electrical connector with the port of the mobile device aligned with the insertion axis, such that the port faces the electrical connector. The computing device may be configured to control the robot arm to translate the mobile device along the insertion axis to electronically couple the mobile device with the electrical connector. Example arrangements of the electrical connectors, the insertion axis, alignment of the mobile device with the insertion axis, and electronically coupling the mobile device with the electrical connector are further illustrated and described with reference to FIG. 6 and FIG. 7 below.

Referring now to FIG. 2 various aspects of the mobile device engagement system 100 are provided in accordance with various embodiments of the present disclosure.

In various embodiments, the mobile device engagement system 100 includes a first imaging device 204 of the one or more imaging devices. The first imaging device 204 may be configured to capture the first image of the mobile device.

In various embodiments, the one or more computing device may determine a two- or three-dimensional position, which position may include an orientation (e.g., an angle of rotation), and/or the width and length (or other dimension(s)) of the mobile device 106 to facilitate engaging the mobile device with the end effector. For example, the one or more computing device, using the first image, may determine corner coordinates of the mobile device, for example, first corner 224, second corner 226, third corner 228, and/or fourth corner 230. In various embodiments, the one or more computing device may determine the orientation of the mobile device by determining an angle between an axis 220 that passes through a middle of the mobile device and axis 218 that passes through a middle of the conveyor belt 104.

In various embodiments, using the corner coordinates and/or orientation of the mobile device 106, the one or more computing device may determine the position and/or dimensions of the mobile device and use the position and/or dimensions information to instruct the robot arm to move the end effector to a corresponding position and/or to be orientated at a corresponding orientation to engage the mobile device. For example, when the end effector includes a gripper, the end effector may engage the mobile device at its corner points and/or corner edges. In some embodiments, an end effector may have asymmetrical dimensions (e.g., a suction gripper that is longer along one axis than another, and the dimensions of the end effector may be aligned with the long and short dimensions of the mobile device.

In various embodiments, using the corner coordinates and/or orientation of the mobile device, the one or more computing device determine a geometric center of at least one surface of the mobile device and instructs the robot arm to move the end effector to the proximity of the geometric center of at least one surface of the mobile device to engage the mobile device. For example, when the end effector includes a suction tool, the end effector may engage the mobile device at and/or at a proximity of the geometric center of at least one surface of the mobile device.

In various embodiments, the one or more computing device may determine the position, dimensions, and/or geometric center of at least one surface of the mobile device using various other image analysis, recognition, and/or calculations on the first image.

Figure 3:
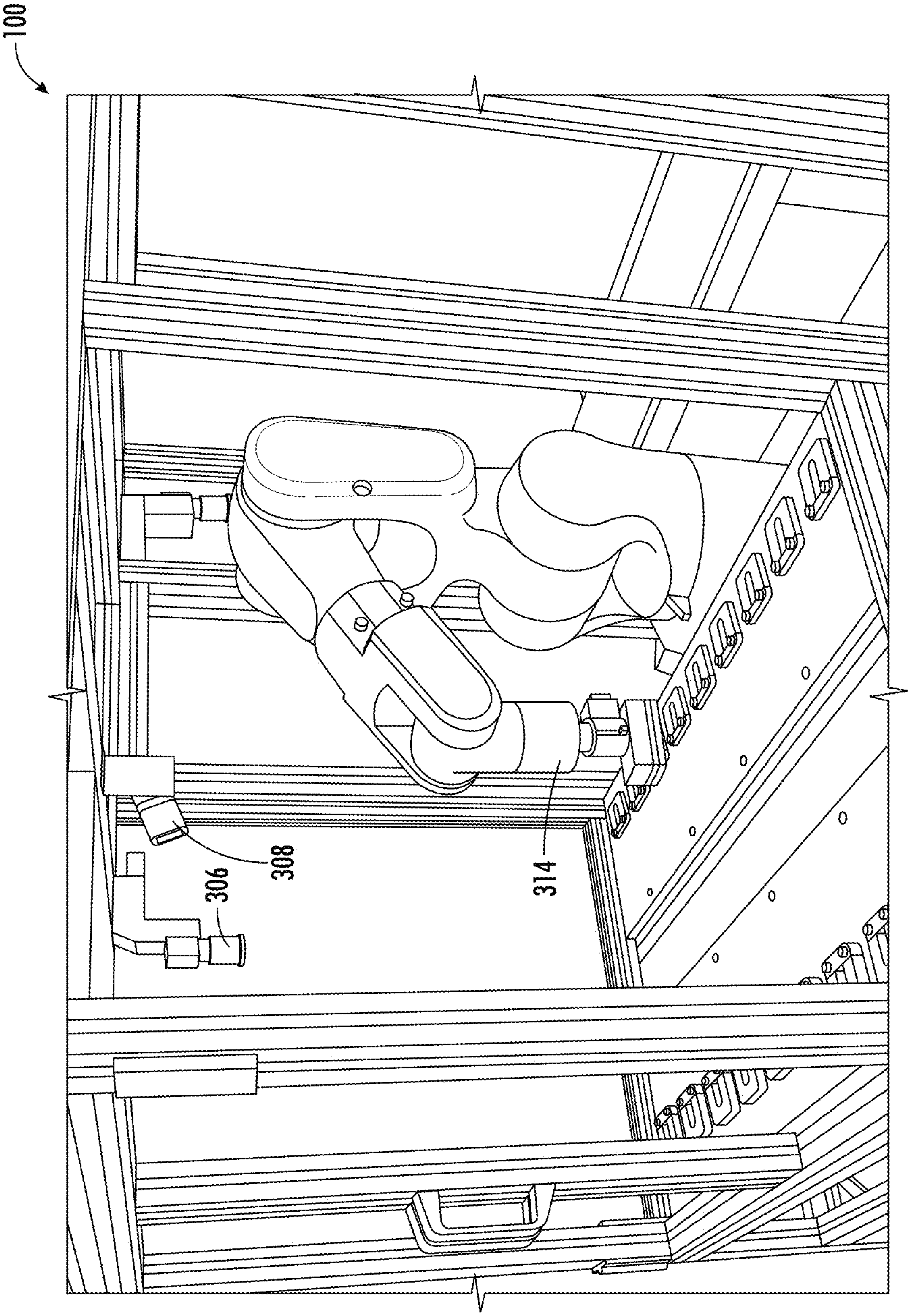
FIG. 3 is another perspective view of a mobile device engagement system, in accordance with various embodiments of the present disclosure.

Referring now to FIG. 3 various aspects of the mobile device engagement system 100 are provided in accordance with various embodiments of the present disclosure.

In various embodiments, the one or more imaging devices are configured to take a second image of mobile device 106 to determine a position of a port of the mobile device. In various embodiments, the position of the port of the mobile device is determined relative to an origin point (e.g., a stationary reference point to facilitate alignment with the electrical connector as further illustrated by FIG. 5).

In various embodiments, the mobile device engagement system 100 includes a second imaging device 306 configured to capture the second image of mobile device 106. However, in various embodiments, a same imaging device may capture the first image and/or the second image. In various alternative embodiments, one of the first image or the second image need not be taken.

In various embodiments, the one or more computing device analyzes the second image to determine a relative position and/or an offset of the port of the mobile device with reference to the origin point as previously described. The one or more computing device may determine a relative position and/or an offset of the port with respect to a corresponding electrical connector using the relative position and/or the offset of the port of the mobile device with reference to the origin point.

In various embodiments, the one or more computing device is configured to determine, using the second image, a type of the port of the mobile device using the second image as previously described. In various embodiments, the one or more computing device is configured to determine an available station having an electrical connector of a same type as the port of the mobile device. In various embodiments, the one or more computing device may determine an available station having an electrical connector with the same type as the port type of the mobile device, using electronic communication with the stations. For example, the one or more computing device may send query signals to the stations to determine availability and/or electrical connector type. In some examples, the stations may continually, intermittently, or upon an electrical coupling/decoupling with a mobile device send a status indicating availability and/or unavailability to the one or more computing device. In some examples, the stations may continually, intermittently, or at least at one time send information indicating the type of the electrical connector to the one or more computing device or the one or more computing device may otherwise receive and store information about the type of the electrical connector of the stations.

In various embodiments, the one or more computing device may determine an available station having an electrical connector with the same type as the port type of the mobile device, using an image captured by an imaging device from the one or more imaging devices. For example, the one or more computing device may analyze an image (e.g., using recognition, AI algorithm, etc.) of the stations to determine available station(s) and the type of their electrical connector(s). In some embodiments, the one or more computing devices may determine an available station from a lack of electrical connection detected electronically via the electrical ports with or without the imaging device. As described herein, the port type of the mobile device may be identified using image data from an imaging device.

In various embodiments, one or more imaging device may image a code on the mobile device. In various embodiments, imaging the code may include capturing an image, scanning using optical and/or laser beams, etc. For example, the mobile device engagement system 100 may include an imaging device 308 configured to image the code on the mobile device. In an example, the imaging device 308 is a dedicated code imaging device, while in some embodiments, the imaging device 308 is used for two or more of the imaging processes described herein. For example, the imaging device 308 may be a two- or three-dimensional camera. In some embodiments, the imaging device 308 may be a barcode scanner. The one or more computing device may be configured to determine a mobile device attribute using the code on the mobile device, and trigger a subsequent mode of operation of the mobile device using the mobile device attribute. For example, the one or more computing device may determine any of a type of software to install on the mobile device, how to wipe data from the mobile device, how to initiate a debug mode of operation (e.g., USB debug mode) for the mobile device, and/or any other mode of operation using the mobile device attribute determined by the code.

Figure 4:
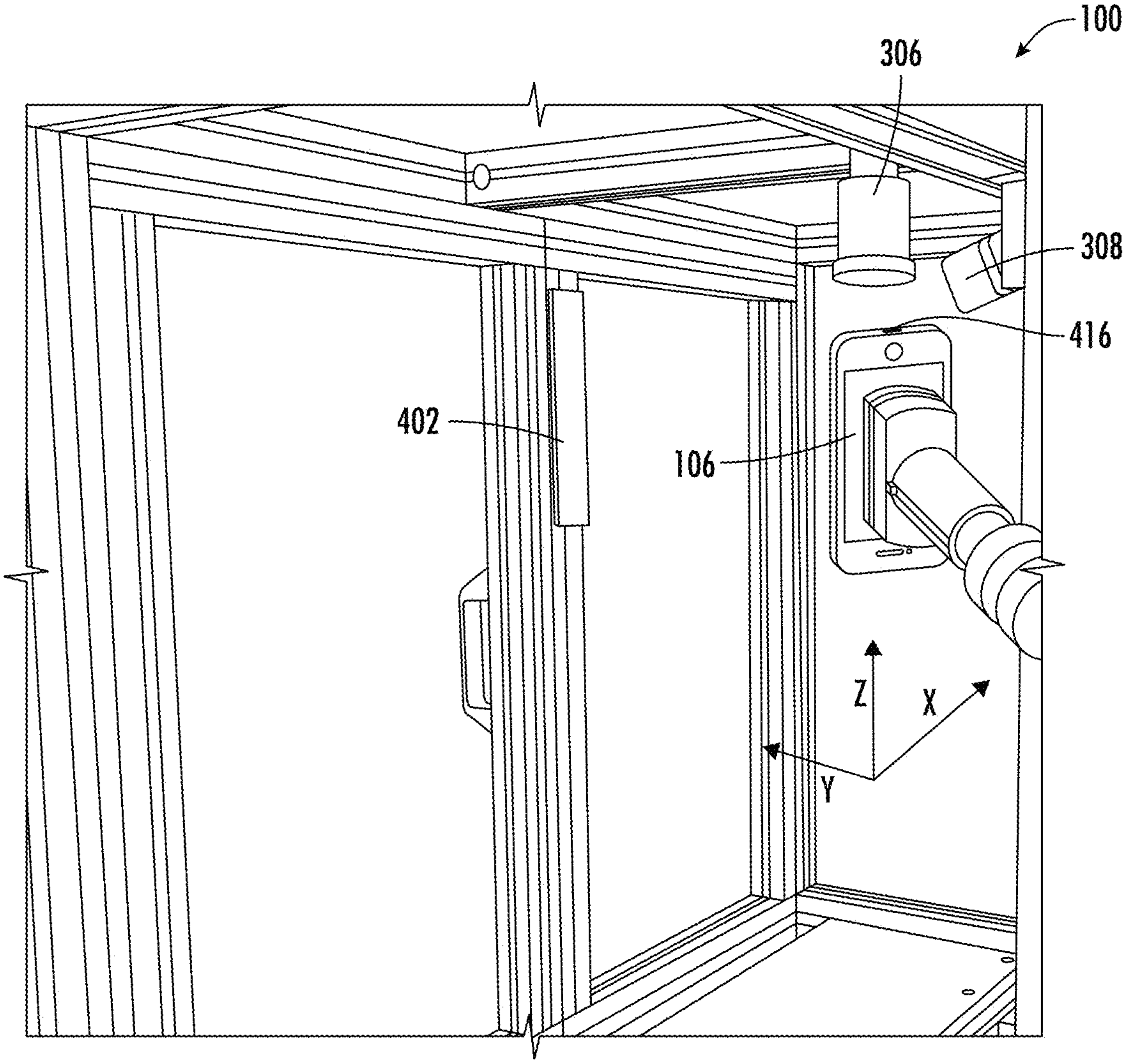
FIG. 4 is a partial view of a mobile device engagement system, in accordance with various embodiments of the present disclosure.

Referring now to FIG. 4 a partial image of various aspects of the mobile device engagement system 100 is provided in accordance with various embodiments of the present disclosure.

In various embodiments, the mobile device engagement system 100 further comprises a mirror 402 configured to reflect a mirror image of the code to the one or more imaging device. For example, using mirror 402 one of the one or more imaging devices may simultaneously capture an image of the port of the mobile device and the code on the mobile device. When the code of the mobile device is not within the field of view of the one or more imaging device configured to image the code, the mirror 402 may adjust and/or increase the field of view of the imaging device and/or reposition the mobile device with the robot arm to include the code. In example embodiments, using mirror 402 may prevent a need to reposition the mobile device to image the code and may increase the operation speed of the mobile device engagement system 100.

In various embodiments, the mirror 402 is configured to reflect a mirror image of the code to the imaging device 308 such that imaging the code of the mobile device 106 by imaging device 308 and capturing the second image of the mobile device 106, e.g. by second imaging device 306 can occur simultaneously and/or can occur when the mobile device is in a location with the port 416 of the mobile device 106 facing second imaging device 306 as for example illustrated by FIG. 4.

Figure 5:
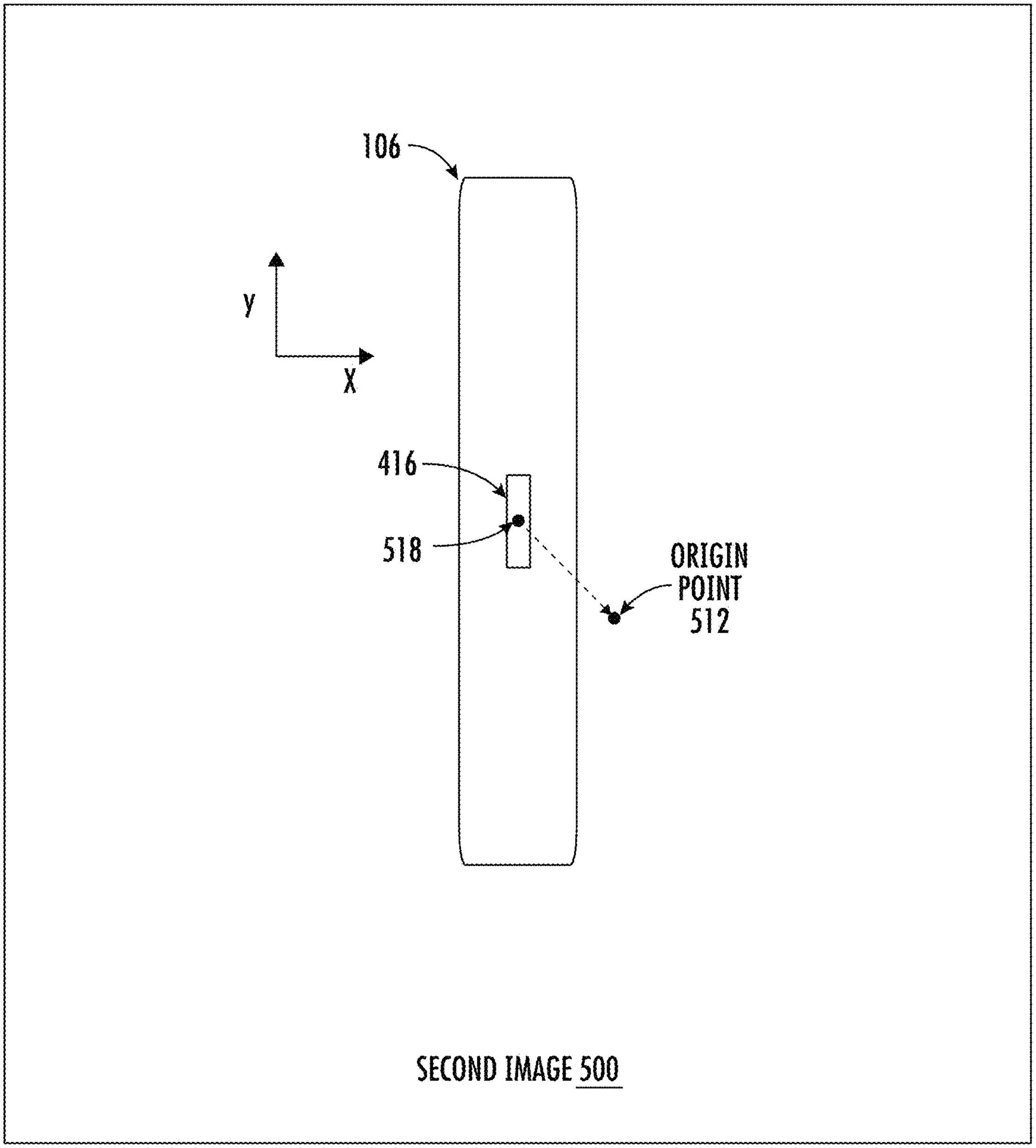
FIG. 5 is an example image of a mobile device showing the port of the mobile device, in accordance with various embodiments of the present disclosure.

Referring now to FIG. 5 an illustration of an example second image 500 of the mobile device 106 captured by an imaging device is provided in accordance with various embodiments of the present disclosure.

In various embodiments, the second image 500 includes an image of the port 416 of the mobile device 106. In various embodiments, the one or more computing device may determine a type of the port 416 using an image analysis of second image 500 such as using shape or pattern recognition techniques.

In various embodiments, the computing device, using second image 500, may determine a two- or three-dimensional offset between a point 518 (such as a center point) on the port 416 and an origin point 512. For example, the computing device determines the offset between the point 518 of the port 416 and the origin point 512 in the X and Y axes. In the depicted embodiment, the origin point 512 is shown in an exaggerated location for ease of understanding, and in some embodiments, the offset may be very small (e.g., a difference in the port location between two devices held by the robot arm in the same robot arm location caused by slight differences in the shape and size of the mobile devices). In various embodiments, the computing device determines the origin point 512 as previously described. For example, the one or more computing device may determine the origin point 512 as a point where the port 416 would be aligned with its corresponding electrical connector, if the center of the port 416 was on the origin point 512. By "aligned", it should be understood that the robot arm may move very precisely and accurately between the imaging location (e.g., the location shown in FIG. 4) and the station(s) (e.g., the location to which the mobile device is being moved in FIG. 7). Thus, the offset calculated at the imaging location may be used to adjust the robot arm position to accurately ensure that the port and electrical connector are in alignment during insertion.

The origin point may be established via calibration as a location configured to cause the port of the mobile device and the electrical connector to align during a preprogrammed movement of the robot arm from the imaging location to one or more stations. In various embodiments, the computing device is configured to calibrate the robot arm 110 and/or the end effector 108 using a test mobile device. For example, the one or more computing device may determine a position of an origin point using a position of the port of the test mobile device in the second image and a known (e.g., measured) relative offset between the port of the test mobile device and the electrical connector. In example embodiments, a port of the test mobile device has a known relative position with respect to the electrical connector of the station when positioned by the robot arm for the second imaging device 306 to capture the second image of the port of the test mobile device. In some embodiments, each station location may be separately calibrated via manual adjustment of the robot arm, and in some embodiments, a single station may be calibrated and offsets may be used to ensure alignment with the remaining stations.

Figure 6:
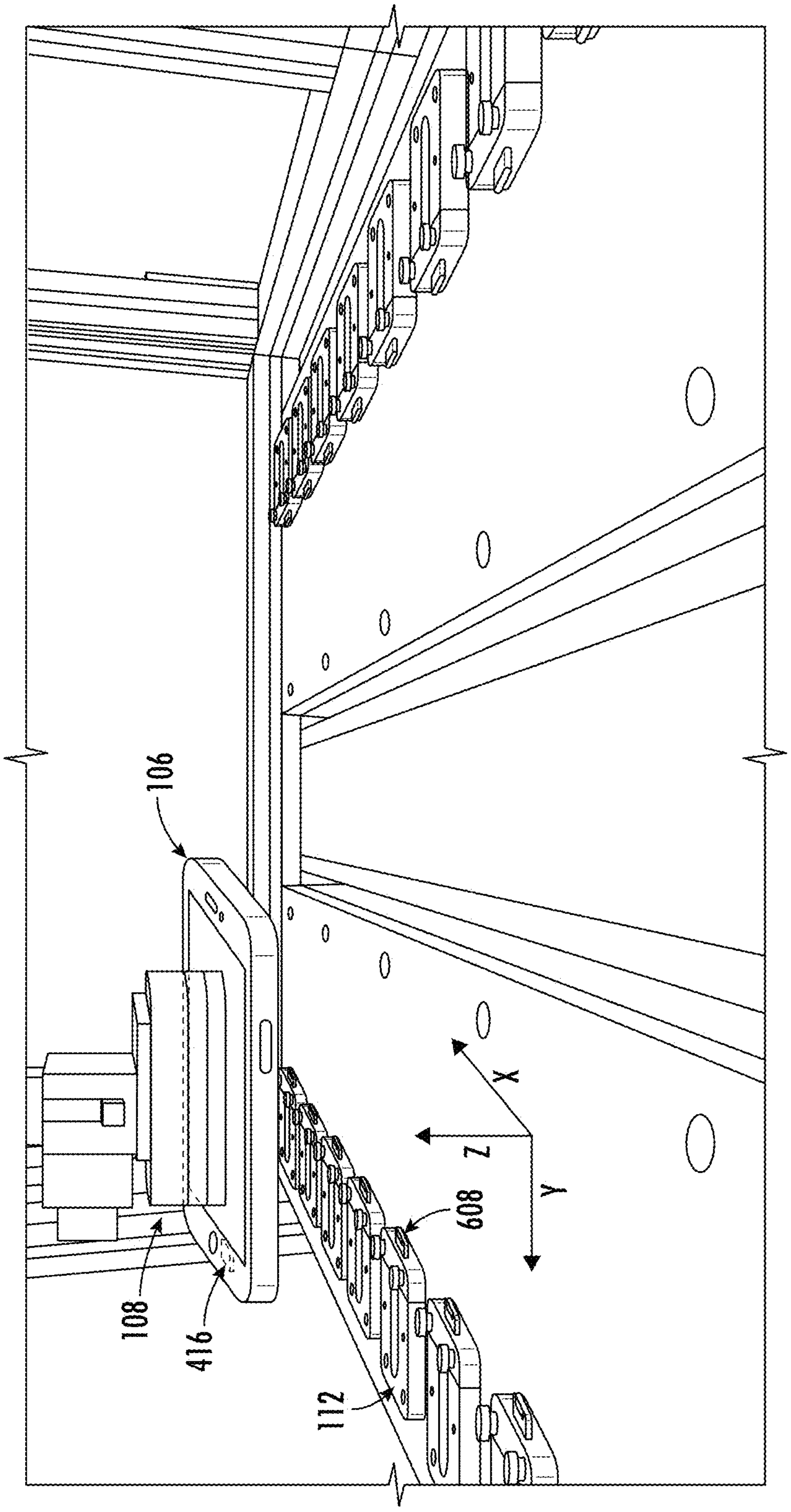
FIG. 6 shows a mobile device engagement system holding a mobile device over a station, in accordance with various embodiments of the present disclosure.

Referring now to FIG. 6 a illustrates various aspects of a mobile device engagement system 100 is provided in accordance with various embodiments of the present disclosure.

In various embodiments, after capturing the second image by the one or more imaging device (e.g., the second imaging device 306) and imaging the code on the mobile device (e.g. by the imaging device 308), the robot arm 110 may begin its programmed movement to the identified station. During the programmed movement, the robot arm 110 moves the mobile device 106 to a proximity of a corresponding station (e.g., station 112) having an available electrical connector (e.g. electrical connector 608) of the same type as the port 416 of the mobile device 106.

In various embodiments, after the robot arm 110 moves the mobile device 106 to the proximity of the corresponding station, the robot arm 110 adjusts a position of the mobile device 106 to align the port 416 with the electrical connector of the corresponding station. For example, the robot arm adjusts a position of the mobile device in the X, Z plane to align the port 416 with an insertion axis (as further described below with reference to FIG. 7).

In various embodiments, the robot arm 110 may adjust the position of the mobile device 106 after the second image is captured and before the mobile device 106 is moved to the proximity of the corresponding electrical connector. For example, referring to FIG. 4 and FIG. 5, the robot arm adjusts a location of the mobile device 106 in the X, Y plane when it is held in front of the second imaging device 306.

In various embodiments, when the port 416 of the mobile device 106 is aligned with the corresponding electrical connector, the robot arm translates the mobile device 106 towards the electrical connector. In various embodiments, one or more computing device uses a force measured using a force sensor to determine how far to translate the mobile device toward the electrical connector.

In various embodiments, the force sensor may be mechanically coupled to the robot arm 110. For example, with reference to FIG. 3, a force sensor 314 may be mechanically coupled to the robot arm such that the force sensor can measure a force applied to the mobile device when translating the mobile device toward the corresponding electrical connector. In some embodiments, the force sensor may be a force torque sensor installed on the robotic arm between two or more components of the robot arm.

In various embodiments, the force sensor may be mechanically coupled to the corresponding station. In various embodiments, any or all of the stations of the mobile device engagement system 100 may include a force sensor, so long as the force between the mobile device and the station (or some portion thereof or feature attached thereto) is determined.

Figure 7:
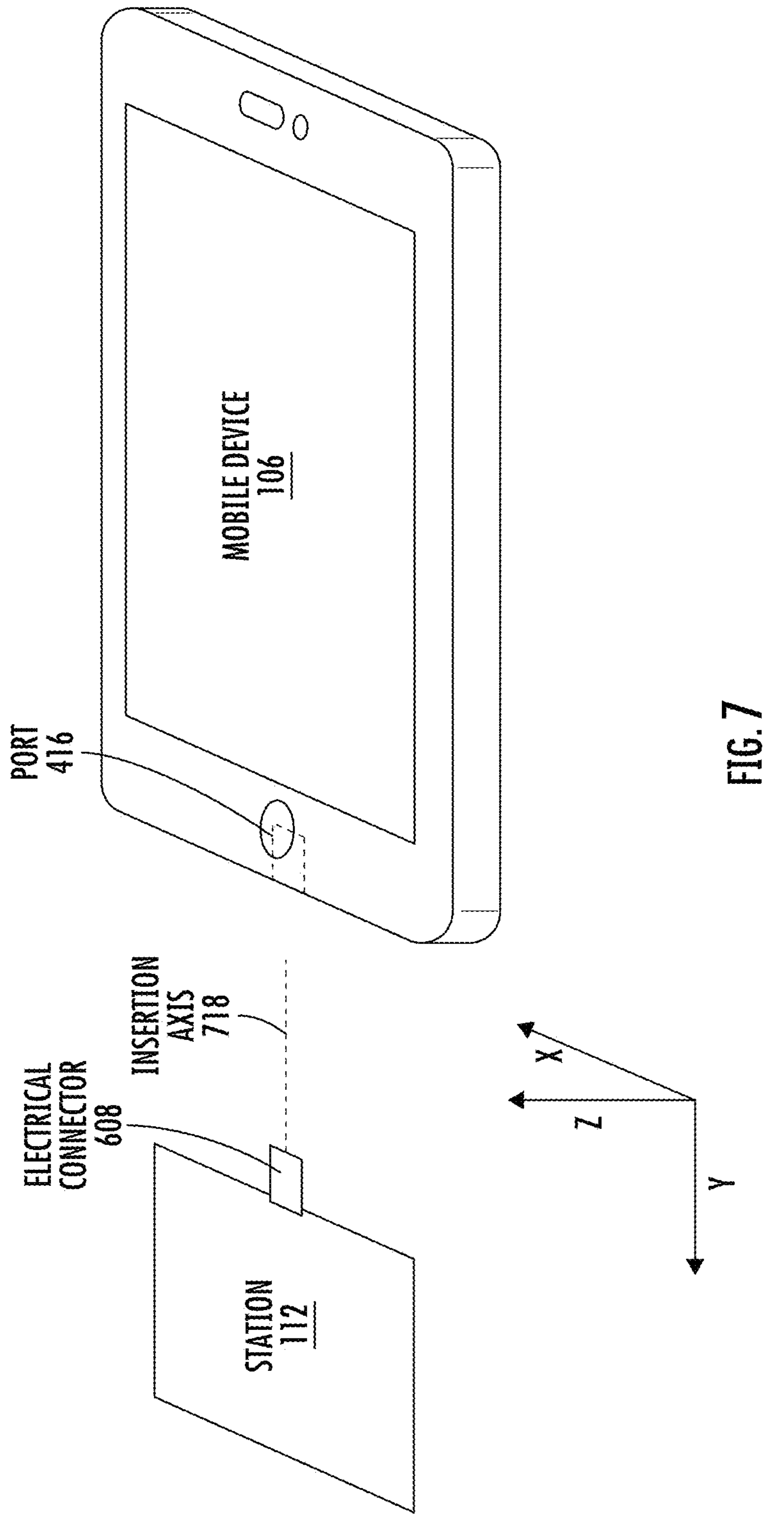
FIG. 7 shows a mobile device being engaged with an electrical connector of a station, in accordance with various embodiments of the present disclosure.

Adjusting a position of the mobile device and electronic coupling of the port 416 of the mobile device 106 with a corresponding station (e.g. station 112) is further illustrated in FIG. 7.

Referring to FIG. 7, the robot arm aligns the port 416 with the insertion axis 718 such that the port 416 is aligned with the electrical connector 608 and can physically and electronically couple when the mobile device 106 is translated to the station 112 along the insertion axis 718. For example, mobile devices using a USB-C port may engage with a corresponding USB-C plug of the station to establish an electronic connection with a charge source and/or one or more computing devices. In some embodiments, the robot arm may move the mobile device from the imaging location to an aligned location with the insertion axis 718 via a series of rotational and/or translational movements.

As previously described, in various embodiments, the mobile device engagement system 100 comprises a force sensor mounted on the one of the robot arm 110, end effector 108, or station 112. The force sensor may be configured to determine a force applied to the electrical connector 608 and/or the station 112 by the mobile device 106, or the force applied to the mobile device 106 by the electrical connector 608 and/or the station 112 during translation of the mobile device by the robot arm.

In various embodiments, the computing device is configured to instruct the robot arm to stop translating the mobile device 106 along the insertion axis 718 toward the electrical connector 608 when the force determined by the force sensor is higher than a force threshold, which threshold may indicate that the station 112 and/or electrical connector 608 is resisting the mobile device 106 to such a degree that the connector must be sufficiently inserted into the port and/or the electrical connector and port are misaligned and the connector is impinging on another portion of the mobile device.

In various embodiments, the computing device is further configured to determine an electronic coupling (e.g. data connection) to the mobile device via the electrical connector. The computing device may determine an electronic connectivity issue between the port of the mobile device and the electrical connector in an instance in which the force is higher than the force threshold and an absence of the electronic coupling (e.g. data connection) with the mobile device 106 via the electrical connector 608 is determined.

In various embodiments, when the electronic connectivity issue is determined, the computing mobile device 106 is configured to instruct the robot arm 110 to move the mobile device 106 away from the electrical connector 608, reposition the mobile device 106 along the insertion axis 718 of the electrical connector 608, and translate the mobile device 106 along the insertion axis 718 to electronically couple with the electrical connector 608.

Figure 8:
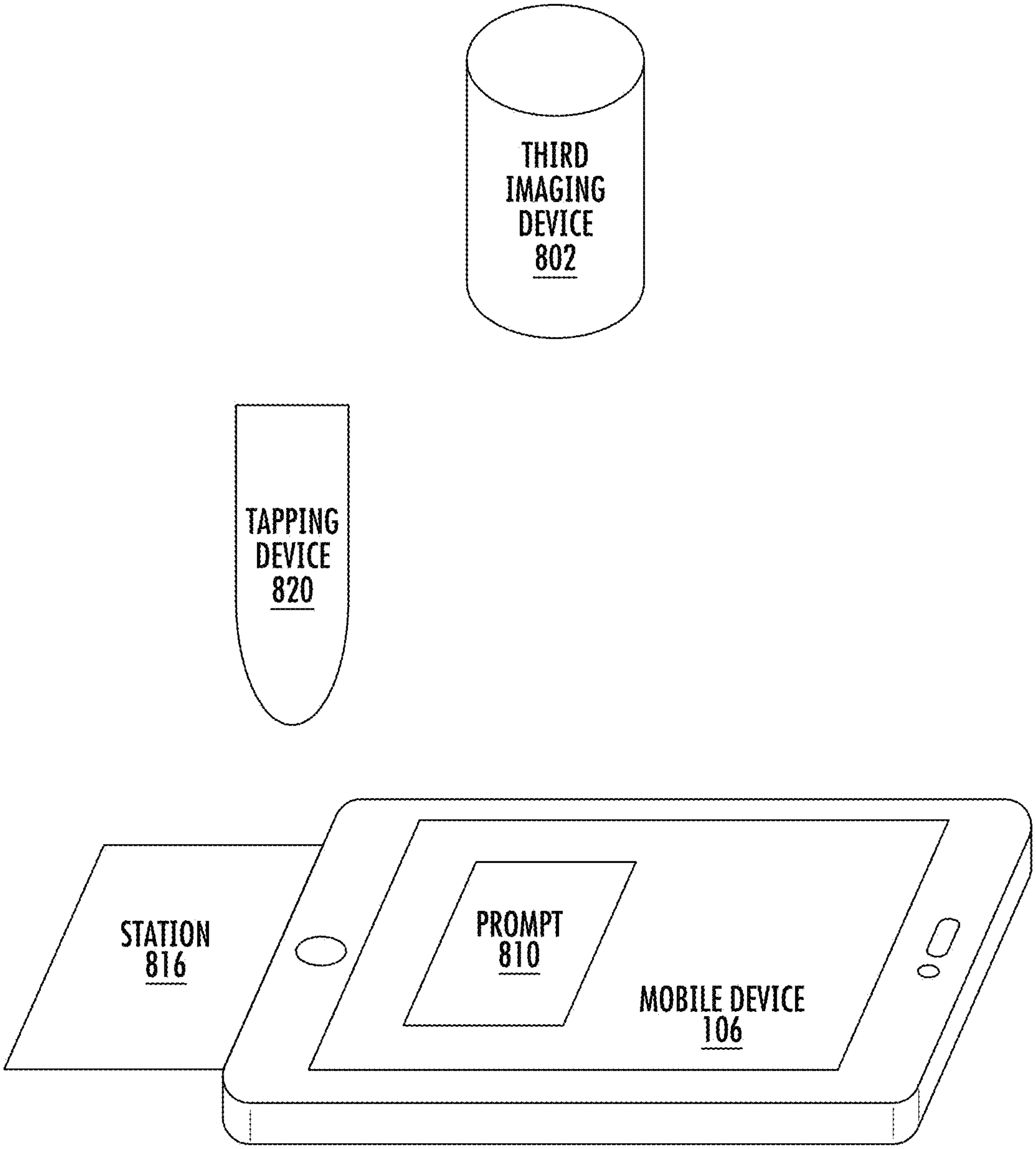
FIG. 8 illustrates portions of a mobile device engagement system, in accordance with various embodiments of the present disclosure.

Referring now to FIG. 8 an illustration of the mobile device 106 and a portion of an embodiment of the system including a tapping device is provided in accordance with various embodiments of the present disclosure.

In various embodiments, when the mobile device is engaged with an electrical connector, the one or more computing device determines whether the electrical coupling (e.g., data connection) between the mobile device and the electrical connector is successful.

In various embodiments, the one or more computing device determines whether it can communicate with the mobile device 106. If successful communication is established, the one or more computing device determines that the electronic coupling is successful. In various embodiments, the one or more computing device may receive a signal indicating of a state of charge, and/or charging state of the mobile device to determine whether the electronic coupling is successful.

In various embodiments, one or more imaging devices may capture a third image of the mobile device. For example, the mobile device engagement system 100 may include a third imaging device 802 to capture the third image. In various embodiments, any of the first and/or second imaging devices may capture the third image of the mobile device. In various embodiments, one or multiple imaging devices may capture images of multiple mobile devices that may be simultaneously electronically coupled to multiple corresponding electrical connectors.

In various embodiments, the one or more computing device may use the third image to determine if the mobile device is successfully electronically coupled with the corresponding electrical connector in addition to or as an alternative to the electronic detection via the connector. For example, the one or more computing device may use various image analysis or recognition techniques to determine if for example a charging indicator, a prompt, etc., is displayed on a screen of the mobile device. In various embodiments, when a charging indicator and/or various other prompts appear on the screen of the mobile device, the one or more computing device may determine that a successful electronic coupling with the electrical connector has occurred.

In various embodiments, after the mobile device is electronically coupled with the electrical connector, a subsequent mode of operation may be run on the mobile device in accordance with the various embodiments discussed herein. For example, the one or more computing device may execute one or more software steps on the mobile device 106 via the electrical connector and/or via manual manipulation of the device, such as with a tapping device 820 (e.g., an actuatable touch probe). For example, the computing device may install an application for diagnostics, data wiping, factory resetting, etc., on the mobile device. In some examples, the computing device run the operating system of the mobile device for example in a debug mode. The one or more software steps may cause at least one prompt 810 to appear on the screen of the mobile device 106.

In various embodiments, the one or more computing device may be configured to use the third image of the mobile device to determine a type and/or location of a prompt 810 on the screen of the mobile device and/or otherwise classify the state of the screen (e.g., via a machine learning model). In various embodiments, the one or more computing device may instruct a peripheral input device to interact with the screen using the type of the prompt and the location of the prompt. For example, the computing device may instruct a tapping device 820 to tap an appropriate prompt on the screen of the mobile device 106. In various embodiments, the one or more computing device may interact with the screen on a software level, for example by sending electronic commands to the mobile device though the electrical connector and the port of the mobile device to for example accept or deny (or take any other appropriate action) in response to the prompt 810.

In various embodiments, the one or more computing device may analyze the third image using Artificial Intelligence (AI) and/or Machine Learning (ML) techniques to determine a navigational state on the screen of the mobile device. For example, the one or more computing device may analyze the prompt and the position of the prompt on the screen to determine a next action to be taken based on one or more objectives (e.g., entering debug mode, wiping the device, executing one or more diagnostics, etc.). In some embodiments, the machine learning model may classify a current state of the screen of the mobile device or a portion thereof (e.g., a prompt) to determine the next action to be taken according to one or more objectives. In various embodiments, the one or more computing device may use a trained machine vision model for the AI and/or ML techniques. The one or more computing device may provide an appropriate navigational input command(s) in response to the navigational state, for example using a peripheral device (such as the tapping device 820) or via software level commands. In various embodiments, the inputs provided to the mobile device may follow an appropriate navigational input command sequence to achieve a desired goal, such as wiping data from the mobile device, resetting the mobile device to factory setting, etc.

Figure 9:
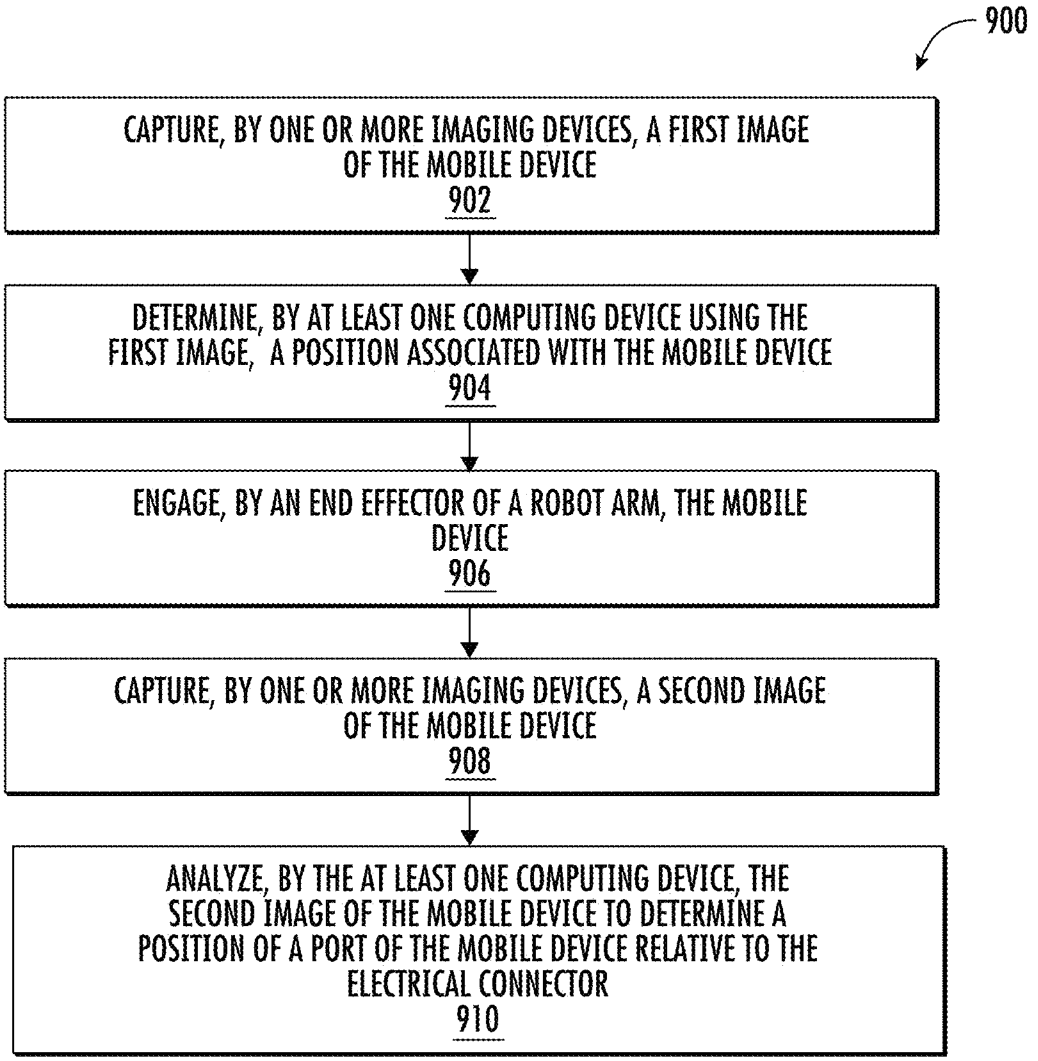
FIG. 9 is a flowchart illustrating various steps of a method for engaging a mobile device, in accordance with various embodiments of the present disclosure.

Referring now to FIG. 9 a flowchart illustrating a method 900 is provided in accordance with various embodiments of the present disclosure with reference to the FIG. 1-FIG. 8 described above, and FIG. 11 as described below.

In various embodiments, at step 902, method 900 captures, by one or more imaging devices, a first image of the mobile device. For example the first imaging device 204 may capture the first image of the mobile device 106.

In various embodiments, at step 904, method 900 determines, by at one or more computing device 1102 using the first image, a position associated with the mobile device. For example, the one or more computing device 1102 may use the first image to determine a position of the mobile device 106.

In various embodiments, at step 906, method 900 engages, by an end effector of a robot arm, the mobile device. For example, the end effector 108 of the robot arm 110 may engage the mobile device 106.

In various embodiments, at step 908, method 900 captures, by one or more imaging devices, a second image of the mobile device. For example, the second imaging device 306 captures the second image of the mobile device 106. The second image may be captured at the imaging location described herein and shown, as one example location, in FIG. 4. Various other locations within reach of the robot arm may be used as the imaging location.

In various embodiments, at step 910, method 900 analyzes, by the one or more computing device 1102, the second image of the mobile device to determine a position of a port of the mobile device relative to the electrical connector. For example, the one or more computing device 1102 may analyze the second image of the mobile device 106 to determine a position of a port 416 of the mobile device 106 with respect to the electrical connector 608 (e.g., for determining the offset described herein).

Figure 10:
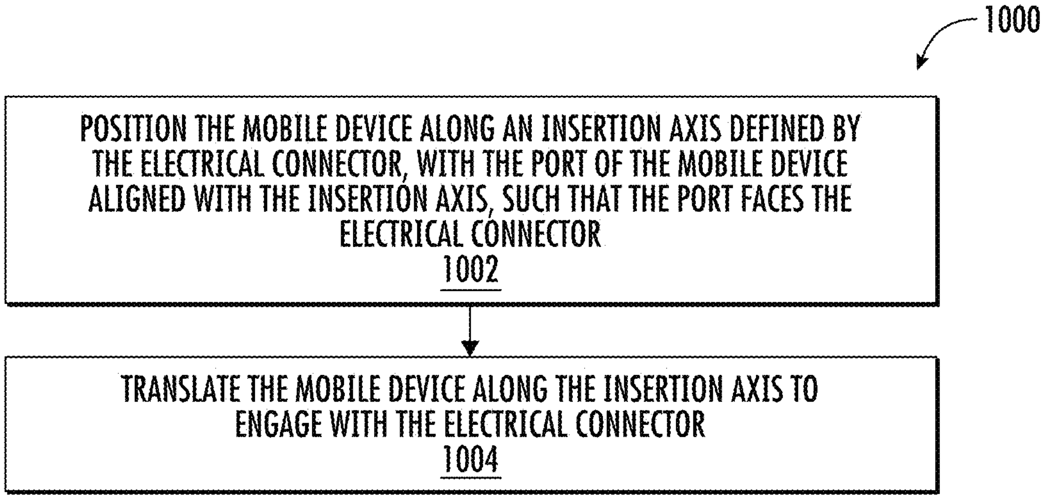
FIG. 10 is a flowchart illustrating various steps of a method for engaging a mobile device, in accordance with various embodiments of the present disclosure.

Referring now to FIG. 10 a schematic diagram illustrating a method 1000 is provided in accordance with various embodiments of the present disclosure with reference to the FIG. 1-FIG. 8 described above, and FIG. 11 as described below.

In various embodiments, at step 1002, method 1000 positions the mobile device along an insertion axis defined by the electrical connector, with the port of the mobile device aligned with the insertion axis, such that the port faces the electrical connector. For example, the one or more computing device 1102 controls the robot arm 110 to position the mobile device 106 along an insertion axis 718 defined by the electrical connector 608, with the port 416 of the mobile device 106 aligned with the insertion axis 718 as for example illustrated in FIG. 6.

In various embodiments, at step 1004, method 1000 translates the mobile device along the insertion axis to engage with the electrical connector. For example, the one or more computing device 1102 controls the robot arm 110 to translates the mobile device 106 along the insertion axis 718 to engage with the electrical connector 608, as for example illustrated in FIG. 6.

Figure 11:
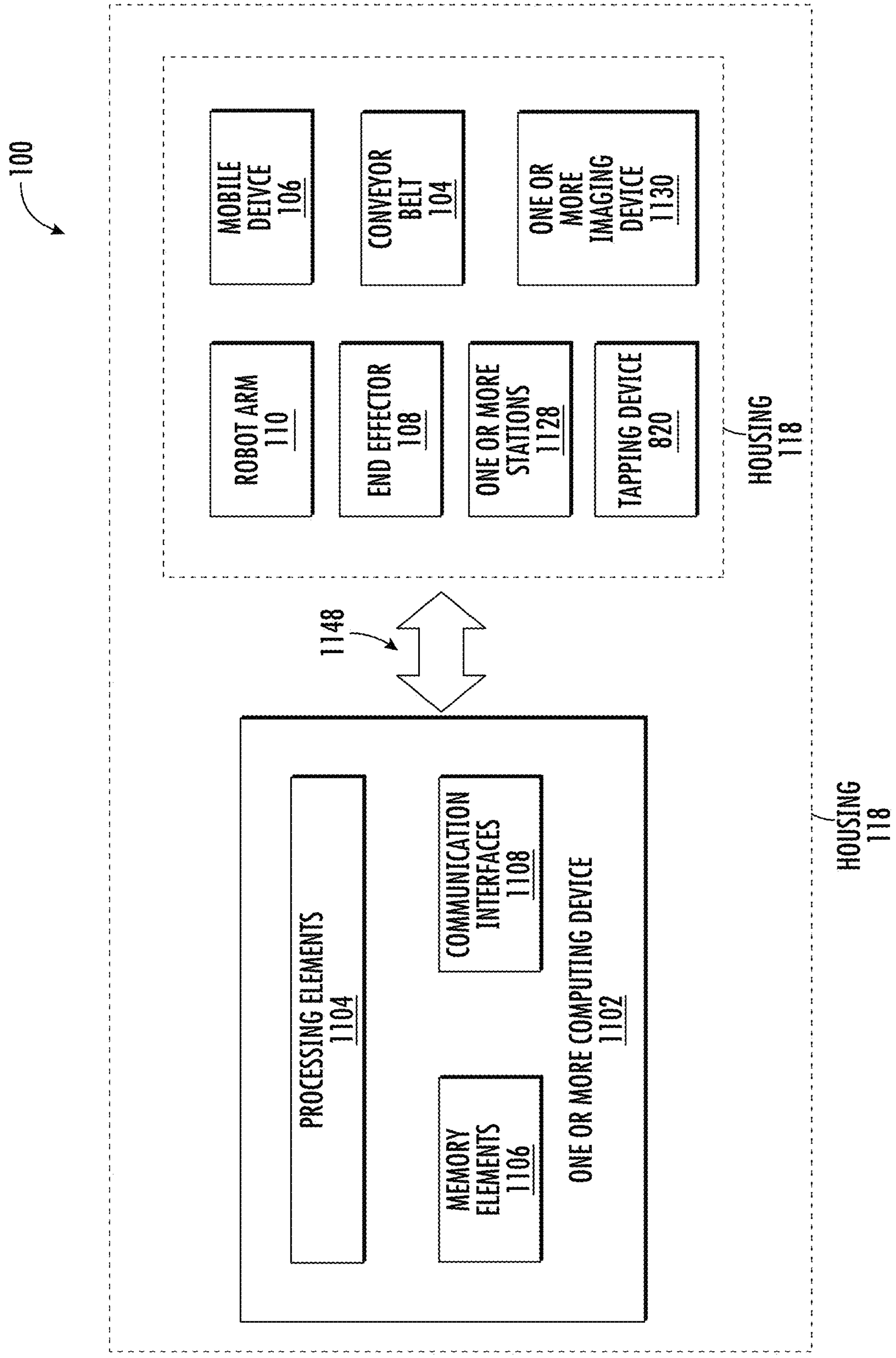
FIG. 11 is a schematic diagram illustrating various components of a mobile device engagement system, in accordance with various embodiments of the present disclosure.

Referring now to FIG. 11 a schematic diagram illustrating various aspects of mobile device engagement system 100 is provided in accordance with various embodiments of the present disclosure.

In various embodiments, the mobile device engagement system 100 includes one or more computing device 1102. In various embodiments, some or all of the one or more computing device 1102 may be placed inside the housing 118 or outside the housing 118. In various embodiments, various other components of the mobile device engagement system 100 may be placed inside the housing 118, outside the housing 118, or partially inside and partially outside the housing 118. For example, the robot arm 110 or the conveyor belt 104 may be placed partially inside and partially outside the housing 118. In various embodiments, some of the one or more imaging device 1130 may be places inside and some may places outside the housing 118. One will appreciate in light of the present disclosure that the one or more computing device may refer to various combinations of computer hardware in any location(s) capable of performing the recited functions. Reference to the "one or more computing device" in multiple instances does not imply or require, and conversely does not preclude, that the same computing device(s) perform each function.

In various embodiments, the one or more computing device 1102 is in communication with various other components of the mobile device engagement system 100 through communication interfaces 1108 and over the connection 1148. In various embodiments, the connection 1148 may be wired and/or wireless.

In general, the terms computing apparatus, computer, system, device, entity, and/or similar words used herein interchangeably can refer to, for example, one or more computers, computing entities, desktops, mobile phones, tablets, notebooks, laptops, distributed systems, kiosks, input terminals, servers or server networks, blades, gateways, switches, processing devices, processing entities, controllers, control systems, set-top boxes, relays, routers, network access points, base stations, the like, and/or any combination of devices or entities adapted to perform the functions, operations, and/or processes described herein. Such functions, operations, and/or processes can include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. The one or more computing device 1102 can include any computing device(s) including, for example, a mobile device handling and/or processing apparatus configured to perform one or more steps/operations of one or more method or techniques described herein. In some embodiments, the one or more computing device 1102 can include and/or be in association with one or more programmable logic controller (PLC), desktop computer(s), laptop(s), server(s), cloud computing platform(s), controller systems, and/or the like. In some example embodiments, the one or more computing device 1102 can be configured to receive and/or transmit mobile device handling and/or processing instructions, data, and/or the like between the one or more mobile device engagement system 100 and/or their components to perform one or more steps/operations of one or more mobile device handling and/or processing techniques described herein.

The mobile device engagement system 100, for example, can include and/or be associated with one or more mobile device engagement components. The mobile device engagement system 100, for example, can include conveyor belt 104, robot arm 110, end effector 108, one or more one or more stations 1128, one or more imaging device 1130, and/or tapping device 820. In some example embodiments, the mobile device engagement system 100 can be configured to receive and/or transmit mobile device handling and/or processing, data, and/or the like from/to the one or more computing device 1102 to perform one or more steps/operations of one or more mobile device handling and/or processing techniques described herein, such as method 900 and/or method 1000.

The one or more computing device 1102 can include, or be in communications with, one or more processing elements 1104 (also referred to as processors, processing circuitry, digital circuitry, and/or similar terms used herein interchangeably) that communicate with other elements within the one or more computing device 1102 via a bus, for example. As will be understood, the processing elements 1104 can be embodied in a number of different ways.

For example, the processing elements 1104 can be embodied as one or more complex programmable logic devices (CPLDs), microprocessors, multi-core processors, coprocessing entities, application-specific instruction-set processors (ASIPs), microcontrollers, and/or controllers. Further, the processing elements 1104 can be embodied as one or more other processing devices or circuitry. The term circuitry can refer to an entirely hardware embodiment or a combination of hardware and computer program products. Thus, the processing elements 1104 can be embodied as integrated circuits, application specific integrated circuits (ASICs), field programmable gate arrays (FPGAs), programmable logic arrays (PLAs), hardware accelerators, digital circuitry, and/or the like.

As will therefore be understood, the processing elements 1104 can be configured for a particular use or configured to execute instructions stored in volatile or non-volatile media or otherwise accessible to the processing elements 1104. As such, whether configured by hardware or computer program products, or by a combination thereof, the processing elements 1104 can be capable of performing steps or operations according to embodiments of the present disclosure when configured accordingly.

In one embodiment, the one or more computing device 1102 can further include, or be in communication with, one or more memory elements 1106. The one or more memory elements 1106 can include non-volatile and/or volatile media. The memory elements 1106, for example, can include non-volatile media (also referred to as non-volatile storage, memory, memory storage, memory circuitry and/or similar terms used herein interchangeably). In one embodiment, the non-volatile storage or memory can include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media can store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably can refer to a collection of records or data that is stored in a computer-readable storage medium using one or more database models, such as a hierarchical database model, network model, relational model, entity-relationship model, object model, document model, semantic model, graph model, and/or the like.

In addition, or alternatively, the memory elements 1106 can include volatile memory. For example, the one or more computing device 1102 can further include, or be in communication with, volatile media (also referred to as volatile storage memory, memory storage, memory circuitry and/or similar terms used herein interchangeably). In one embodiment, the volatile storage or memory can also include one or more volatile storage or memory media, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media can be used to store at least portions of the databases, database instances, database management systems, data, applications, programs, program modules, scripts, source code, object code, byte code, compiled code, interpreted code, machine code, executable instructions, and/or the like being executed by, for example, the processing elements 1104. Thus, the databases, database instances, database management systems, data, applications, programs, program modules, scripts, source code, object code, byte code, compiled code, interpreted code, machine code, executable instructions, and/or the like can be used to control certain aspects of the operation of the one or more computing device 1102 with the assistance of the processing elements 1104 and operating system.

As indicated, in one embodiment, the one or more computing device 1102 can also include one or more communication interfaces 1108 for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the one or more computing device 1102 can be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The mobile device engagement system 100 can include input/output circuitry for communicating with one or more users or other systems or devices. The input/output circuitry, for example, can include one or more interfaces for providing and/or receiving information from one or more users or other systems or devices mobile device engagement system 100 or otherwise. The input/output circuitry can be configured to receive user input or input from various other systems or devices through one or more of the interfaces of the mobile device engagement system 100.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A mobile device engagement system for engaging a mobile device with an electrical connector, the mobile device engagement system comprising:

one or more imaging devices configured to capture a first image and a second image of the mobile device;

a robot arm comprising an end effector configured to engage and facilitate positioning of the mobile device;

a plurality of stations, each comprising a corresponding electrical connector, including a station comprising the electrical connector; and at least one computing device configured to:

determine a position associated with the mobile device using the first image;

control the robot arm to engage the mobile device with the end effector using the position associated with the mobile device;

determine a type of a port of the mobile device using the second image;

determine that the station is available;

determine that the electrical connector of the station is of a same type as the port of the mobile device;

analyze the second image of the mobile device to determine a position of a port of the mobile device relative to the electrical connector; and control the robot arm to:

position the mobile device along an insertion axis defined by the electrical connector with the port of the mobile device aligned with the insertion axis, such that the port faces the electrical connector; and translate the mobile device along the insertion axis to engage with the electrical connector.

2. The system of claim 1, further comprising a force sensor mounted on one of the robot arm or the station comprising the electrical connector, the force sensor configured to determine a force applied to the electrical connector and/or the station by the mobile device, wherein the at least one computing device is further configured to:

instruct the robot arm to stop translating the mobile device along the insertion axis toward the electrical connector when the force determined by the force sensor is higher than a force threshold.

3. The system of claim 2, wherein the at least one computing device is further configured to determine an electronic connectivity issue between the port of the mobile device and the electrical connector in an instance in which the force is higher than the force threshold and an absence of an electronic coupling with the mobile device via the electrical connector is determined.

4. The system of claim 3, wherein the at least one computing device is further configured to, when the electronic connectivity issue is determined, instruct the robot arm to:

move the mobile device away from the electrical connector;

reposition the mobile device along the insertion axis of the electrical connector; and translate the mobile device along the insertion axis to engage with the electrical connector.

5. The system of claim 1, wherein at least one of the one or more imaging devices is configured to capture a third image of a screen of the mobile device after the mobile device engages the electrical connector and an electronic coupling to the mobile device is established, and wherein the at least one computing device is configured to:

determine a type and/or location of a prompt on the screen using the third image; and instruct a peripheral input device to interact with the mobile device using the type of the prompt and the location of the prompt.

6. The system of claim 1, wherein the one or more imaging devices are configured to image a code on the mobile device, wherein the at least one computing device is configured to:

determine a mobile device attribute using the code on the mobile device; and trigger a subsequent mode of operation of the mobile device using the mobile device attribute.

7. The system of claim 6, further comprising a mirror configured to reflect a mirror image of the code to a code imaging device of the one or more imaging devices such that imaging the code of the mobile device and capturing the second image of the mobile device can occur simultaneously and/or can occur when the mobile device is in a same location.

8. The system of claim 1, further comprising, a conveyor belt configured to carry the mobile device from a first location to a proximity of the robot arm, the proximity being within reach of the robot arm, wherein the robot arm is configured to:

lift the mobile device from the conveyor belt; and place the mobile device on the conveyor belt or a second conveyor belt after a subsequent mode of operation of the mobile device is run, and wherein the conveyor belt or the second conveyor belt is configured to carry the mobile device to a second location.

9. The system of claim 1, further comprising a housing that houses the robot arm and the one or more imaging devices, wherein one or more of the at least one computing device are disposed in the housing or outside the housing.

10. A computer-implemented method for engaging a mobile device with an electrical connector via a mobile device engagement system, the computer-implemented method comprising an engagement operation, wherein the engagement operation comprises at least:

capturing, by one or more imaging devices, a first image of the mobile device;

determining, by at least one computing device using the first image, a position associated with the mobile device;

engaging, by an end effector of a robot arm, the mobile device;

capturing, by one or more imaging devices, a second image of the mobile device;

determining, by the at least one computing device, a type of a port of the mobile device using the second image;

determining, by the at least one computing device, that a station among a plurality of stations is available, wherein each station comprises a corresponding electrical connector, including the station comprising the electrical connector;

determining that the electrical connector of the station is of a same type as the port of the mobile device;

analyzing, by the at least one computing device, the second image of the mobile device to determine a position of a port of the mobile device relative to the electrical connector; and controlling the robot arm to:

position the mobile device along an insertion axis defined by the electrical connector, with the port of the mobile device aligned with the insertion axis, such that the port faces the electrical connector; and translate the mobile device along the insertion axis to engage with the electrical connector.

11. The computer-implemented method of claim 10, further comprising:

determining, by a force sensor, a force applied to the electrical connector by the mobile device during translation of the mobile device by the robot arm, wherein the force sensor is mounted on the station comprising the electrical connector; and instructing, by the at least one computing device, the robot arm to stop translating the mobile device along the insertion axis toward the electrical connector when the force determined by the force sensor is higher than a force threshold.

12. The computer-implemented method of claim 11, further comprising:

determining, by the at least one computing device, an electronic connectivity issue between the port of the mobile device and the electrical connector in an instance in which the force is higher than the force threshold and an absence of an electronic coupling with the mobile device via the electrical connector is determined; and when the electronic connectivity issue is determined, instructing, by the at least one computing device, the robot arm to:

move the mobile device away from the electrical connector;

reposition the mobile device along the insertion axis of the electrical connector; and translate the mobile device along the insertion axis to engage with the electrical connector.

13. The computer-implemented method of claim 10, further comprising:

capturing, by at least one of the one or more imaging devices, a third image of a screen of the mobile device after the mobile device engages the electrical connector and an electronic coupling to the mobile device is established;

determining, by the at least one computing device, a type and/or location of a prompt on the screen using the third image; and instructing, by the at least one computing device, a peripheral input device to interact with the mobile device using the type of the prompt and the location of the prompt.

14. The computer-implemented method of claim 10, further comprising:

imaging, by a code imaging device, a code on the mobile device;

determining, by the at least one computing device, a mobile device attribute using the code on the mobile device; and triggering, by the at least one computing device, a subsequent mode of operation of the mobile device using the mobile device attribute.

15. An apparatus for engaging a mobile device with an electrical connector of a station among a plurality of stations, wherein each station of the plurality of stations comprises a corresponding electrical connector, including the station comprising the electrical connector, via a mobile device engagement system, the apparatus comprising at least one processor and at least one non-transitory memory including computer-coded instructions thereon, the computer coded instructions, with the at least one processor, cause the apparatus to:

capture, using one or more imaging devices, a first image of the mobile device;

engage, using an end effector of a robot arm, the mobile device;

capture, using one or more imaging devices, a second image of the mobile device;

determine a type of a port of the mobile device using the second image;

determine that the station is available;

determine that the electrical connector of the station is of a same type as the port of the mobile device; and control the robot arm to:

position the mobile device along an insertion axis defined by the electrical connector, with the port of the mobile device aligned with the insertion axis based on an offset determined using the second image, such that the port faces the electrical connector; and translate the mobile device along the insertion axis to engage with the electrical connector.

16. The apparatus of claim 15, wherein the computer coded instructions further cause the apparatus to:

in response to a signal indicative of an electronic connectivity issue, control the robot arm to:

move the mobile device away from the electrical connector;

reposition the mobile device along the insertion axis of the electrical connector; and translate the mobile device along the insertion axis to engage with the electrical connector.

17. The apparatus of claim 15, wherein the computer coded instructions further cause the apparatus to:

based on a type and/or location of a prompt on a screen of the mobile device, instruct a peripheral input device to interact with the mobile device using the type of the prompt and the location of the prompt.

18. The apparatus of claim 15, wherein the computer coded instructions further cause the apparatus to:

determine, by a force sensor, a force applied to the electrical connector by the mobile device during translation of the mobile device by the robot arm, wherein the force sensor is mounted on the station comprising the electrical connector; and instruct the robot arm to stop translating the mobile device along the insertion axis toward the electrical connector when the force determined by the force sensor is higher than a force threshold.

19. A mobile device engagement system for engaging a mobile device with an electrical connector, the mobile device engagement system comprising:

one or more imaging devices configured to capture a first image and a second image of the mobile device;

a robot arm comprising an end effector configured to engage and facilitate positioning of the mobile device;

a force sensor mounted on one of the robot arm or a station comprising the electrical connector, the force sensor configured to determine a force applied to the electrical connector and/or the station by the mobile device; and at least one computing device configured to:

determine a position associated with the mobile device using the first image;

control the robot arm to engage the mobile device with the end effector using the position associated with the mobile device;

analyze the second image of the mobile device to determine a position of a port of the mobile device relative to the electrical connector;

control the robot arm to:

position the mobile device along an insertion axis defined by the electrical connector with the port of the mobile device aligned with the insertion axis, such that the port faces the electrical connector;

translate the mobile device along the insertion axis to engage with the electrical connector; and stop translating the mobile device along the insertion axis toward the electrical connector when the force determined by the force sensor is higher than a force threshold; and determine an electronic connectivity issue between the port of the mobile device and the electrical connector in an instance in which the force is higher than the force threshold and an absence of an electronic coupling with the mobile device via the electrical connector is determined.

20. The system of claim 19, wherein the at least one computing device is further configured to, when the electronic connectivity issue is determined, instruct the robot arm to:

move the mobile device away from the electrical connector;

reposition the mobile device along the insertion axis of the electrical connector; and translate the mobile device along the insertion axis to engage with the electrical connector.

21. The system of claim 19, wherein at least one of the one or more imaging devices is configured to capture a third image of a screen of the mobile device after the mobile device engages the electrical connector and an electronic coupling to the mobile device is established, and wherein the at least one computing device is configured to:

determine a type and/or location of a prompt on the screen using the third image; and instruct a peripheral input device to interact with the mobile device using the type of the prompt and the location of the prompt.

22. The system of claim 19, further comprising:

a plurality of stations, each comprising a corresponding electrical connector, including a station comprising the electrical connector, wherein the one or more imaging devices are configured to image a code on the mobile device, and wherein the at least one computing device is further configured to:

determine a type of the port of the mobile device using the second image;

determine that the station is available;

determine that the electrical connector is of a same type as the port of the mobile device;

determine a mobile device attribute using the code on the mobile device; and trigger a subsequent mode of operation of the mobile device using the mobile device attribute.

23. The system of claim 22, further comprising a mirror configured to reflect a mirror image of the code to a code imaging device of the one or more imaging devices such that imaging the code of the mobile device and capturing the second image of the mobile device can occur simultaneously and/or can occur when the mobile device is in a same location.

24. The system of claim 19, further comprising, a conveyor belt configured to carry the mobile device from a first location to a proximity of the robot arm, the proximity being within reach of the robot arm, wherein the robot arm is configured to:

lift the mobile device from the conveyor belt; and place the mobile device on the conveyor belt or a second conveyor belt after a subsequent mode of operation of the mobile device is run, and wherein the conveyor belt or the second conveyor belt is configured to carry the mobile device to a second location.

25. The system of claim 19, further comprising a housing that houses the robot arm and the one or more imaging devices, wherein one or more of the at least one computing device are disposed in the housing or outside the housing.

26. A computer-implemented method for engaging a mobile device with an electrical connector via a mobile device engagement system, the computer-implemented method comprising an engagement operation, wherein the engagement operation comprises at least:

capturing, by one or more imaging devices, a first image of the mobile device;

determining, by at least one computing device using the first image, a position associated with the mobile device;

engaging, by an end effector of a robot arm, the mobile device;

capturing, by one or more imaging devices, a second image of the mobile device;

analyzing, by the at least one computing device, the second image of the mobile device to determine a position of a port of the mobile device relative to the electrical connector;

controlling the robot arm to:

position the mobile device along an insertion axis defined by the electrical connector, with the port of the mobile device aligned with the insertion axis, such that the port faces the electrical connector; and translate the mobile device along the insertion axis to engage with the electrical connector;

determining, by a force sensor, a force applied to the electrical connector by the mobile device during translation of the mobile device by the robot arm, wherein the force sensor is mounted on a station comprising the electrical connector;

instructing, by the at least one computing device, the robot arm to stop translating the mobile device along the insertion axis toward the electrical connector when the force determined by the force sensor is higher than a force threshold;

determining, by the at least one computing device, an electronic connectivity issue between the port of the mobile device and the electrical connector in an instance in which the force is higher than the force threshold and an absence of an electronic coupling with the mobile device via the electrical connector is determined; and when the electronic connectivity issue is determined, instructing, by the at least one computing device, the robot arm to:

move the mobile device away from the electrical connector;

reposition the mobile device along the insertion axis of the electrical connector; and translate the mobile device along the insertion axis to engage with the electrical connector.

27. The computer-implemented method of claim 26, further comprising:

capturing, by at least one of the one or more imaging devices, a third image of a screen of the mobile device after the mobile device engages the electrical connector and an electronic coupling to the mobile device is established;

determining, by the at least one computing device, a type and/or location of a prompt on the screen using the third image; and instructing, by the at least one computing device, a peripheral input device to interact with the mobile device using the type of the prompt and the location of the prompt.

28. The computer-implemented method of claim 27, further comprising:

imaging, by a code imaging device, a code on the mobile device;

determining, by the at least one computing device, a mobile device attribute using the code on the mobile device; and triggering, by the at least one computing device, a subsequent mode of operation of the mobile device using the mobile device attribute.

29. An apparatus for engaging a mobile device with an electrical connector via a mobile device engagement system, the apparatus comprising at least one processor and at least one non-transitory memory including computer coded instructions thereon, the computer coded instructions, with the at least one processor, cause the apparatus to:

capture, using one or more imaging devices, a first image of the mobile device;

engage, using an end effector of a robot arm, the mobile device;

capture, using one or more imaging devices, a second image of the mobile device; and control the robot arm to:

position the mobile device along an insertion axis defined by the electrical connector, with a port of the mobile device aligned with the insertion axis based on an offset determined using the second image, such that the port faces the electrical connector;

translate the mobile device along the insertion axis to engage with the electrical connector; and in response to a signal indicative of an electronic connectivity issue, control the robot arm to:

move the mobile device away from the electrical connector;

reposition the mobile device along the insertion axis of the electrical connector; and translate the mobile device along the insertion axis to engage with the electrical connector.

30. The apparatus of claim 29, wherein the computer coded instructions further cause the apparatus to:

based on a type and/or location of a prompt on a screen of the mobile device, instruct a peripheral input device to interact with the mobile device using the type of the prompt and the location of the prompt.

31. The apparatus of claim 29, wherein the computer coded instructions further cause the apparatus to:

determine, by a force sensor, a force applied to the electrical connector by the mobile device during translation of the mobile device by the robot arm, wherein the force sensor is mounted on a station comprising the electrical connector; and instruct the robot arm to stop translating the mobile device along the insertion axis toward the electrical connector when the force determined by the force sensor is higher than a force threshold.

* * * * *